(12) United States Patent
Ozawa et al.

(10) Patent No.: US 7,660,722 B2
(45) Date of Patent: Feb. 9, 2010

(54) TERMINAL APPARATUS, SERVER, CONTENT DATA STORAGE METHOD, AND PROGRAM FOR EXECUTING THE METHOD

(75) Inventors: Jun Ozawa, Nara (JP); Takahiro Kudo, Osaka (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 1407 days.

(21) Appl. No.: 10/344,822

(22) PCT Filed: May 29, 2002

(86) PCT No.: PCT/JP02/05243

§ 371 (c)(1),
(2), (4) Date: Feb. 14, 2003

(87) PCT Pub. No.: WO02/097670

PCT Pub. Date: Dec. 5, 2002

(65) Prior Publication Data

US 2003/0187682 A1    Oct. 2, 2003

(30) Foreign Application Priority Data

May 30, 2001    (JP) ............................ 2001-162875

(51) Int. Cl.
*G06Q 99/00* (2006.01)
(52) U.S. Cl. ....................................................... 705/1
(58) Field of Classification Search ........................ 705/1
See application file for complete search history.

(56) References Cited

U.S. PATENT DOCUMENTS

| 5,832,446 | A | * | 11/1998 | Neuhaus ............................ 705/1 |
| 5,887,243 | A | * | 3/1999 | Harvey et al. ................... 725/136 |
| 5,963,948 | A | * | 10/1999 | Shilcrat ............................ 707/100 |
| 6,009,439 | A |   | 12/1999 | Shiomi et al. |
| 6,061,692 | A | * | 5/2000 | Thomas et al. ................... 707/200 |
| 6,097,016 | A | * | 8/2000 | Hirata et al. ..................... 219/720 |
| 6,342,901 | B1 | * | 1/2002 | Adler et al. ...................... 715/700 |

(Continued)

FOREIGN PATENT DOCUMENTS

EP    1041860 A2    10/2000

(Continued)

OTHER PUBLICATIONS

International Search Report—PCT/JP02/05243; ISA/JPO, Jul. 8, 2002.

(Continued)

Primary Examiner—Jonathan Ouellette
(74) Attorney, Agent, or Firm—Harness, Dickey & Pierce, P.L.C.

(57) ABSTRACT

The users are allowed to easily retrieve contents data such as recipe data. A personal computer (103) receives recipe data from a server (101) via a communication network (102), and stores the received recipe data in a memory card (104). The personal computer updates recipe hierarchical information (142) in the memory card (104), i.e., information which indicates classified levels of recipe data based on retrieval keys, with reference to overall hierarchical information (133), i.e., information which indicates the hierarchical relation of retrieval keys in the whole recipes, so that the newly stored recipe data is included in the recipe hierarchical information.

6 Claims, 21 Drawing Sheets

U.S. PATENT DOCUMENTS

| | | | |
|---|---|---|---|
| 6,370,513 B1 * | 4/2002 | Kolawa et al. | 705/10 |
| 6,393,427 B1 | 5/2002 | Vu et al. | |
| 6,949,729 B1 * | 9/2005 | Ishikawa et al. | 219/702 |

FOREIGN PATENT DOCUMENTS

| | | |
|---|---|---|
| JP | 11-242686 A | 9/1999 |
| JP | 2000276494 A | 10/2000 |
| JP | 2000-346366 | 12/2000 |
| WO | WO 00/67159 | 11/2000 |

OTHER PUBLICATIONS

Kimihiko Kimura; "MP3 Jukebox 4.4 By Music Match Developed by Sumitomo Metal System, Improved Sound Quality By Employing New Encode Engine"; PC fan, p. 133; vol. 7; No. 9; May 15,2000; Mainichi Communications Inc.

Takashi Kamioka; "AV Complete Utilization; Jukebox Soft Case"; Journal of Nikkei Personal Computer; pp. 180-187; No. 363; Jun. 12, 2000; Nikkei Business Publications, Inc.

ISA/EPO for EP 02730766 dated Feb. 19, 2004.

Hiraiwa, Shinichi et al., "Info-Plaza: A Social Information Filtering System For The World-Wide Web", Proceedings of the International Conference on Parallel and Distributed Systems, IEEE Computer Society Inc., Los Alamitos, CA, US. Jun. 3, 1966, pp. 10-15.

Maarek, Yoelle S. et al., "Automatically Organizing Bookmarks Per Contents", Computer Networks and ISDN Systems, North Holland Publishing, Amsterdam, NL, vol. 28, No. 11 (May 1996) pp. 1321-1333.

Li, Wen-Syan et al., "PowerBookmarks: A System for Personalizable Web Information Organization, Sharing, and Management", Computer Networks, Elsevier Science Publishers B.V., Amsterdam, NL, vol. 31, No. 11-16 (May 1999) pp. 1375-1389.

* cited by examiner

FIG. 6
(a)
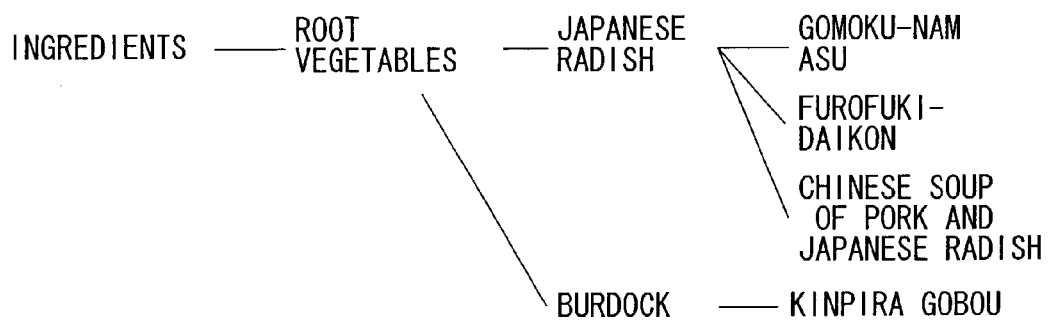
(b)
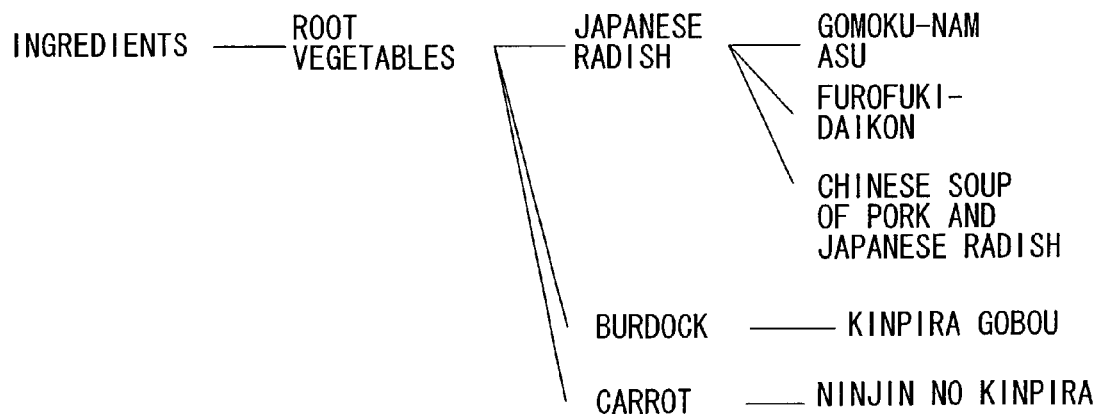

TERMINAL APPARATUS, SERVER, CONTENT DATA STORAGE METHOD, AND PROGRAM FOR EXECUTING THE METHOD

TECHNICAL FIELD

The present invention relates to a technology of storing contents data in a recording medium such as a semiconductor memory card so as to facilitate retrieval of the data.

BACKGROUND ART

With the recent rapid spread and progress of the Internet, services of transmitting various kinds of information to the users are implemented in various forms.

In addition to allowing each user to merely view the received contents data by a terminal device, these services include allowing each user to store the downloaded contents data (e.g., music data) in a recording medium such as a semiconductor memory card and enjoy the contents data with another application equipment.

Problems

A method for distributing recipe data for preparing a meal with a cooking appliance such as a microwave oven from a server has been proposed as one of the services described above. According to this method, each user can download recipe data of any meal he/she likes and store the downloaded recipe data in a recording medium. By mounting the recording medium to the cooking appliance, each user can easily prepare any meal he/she likes by using the recipe data.

In such a service, however, as the number of downloaded recipes is increased, it becomes more difficult to find required recipe data from the large amount of recipe data recorded on the recording medium. In order to improve convenience of the user in this respect, a mechanism for facilitating retrieval of recipe data is required.

The kinds of recipe data to be downloaded vary depending on the preferences of the users. Moreover, the users would add or delete recipe data frequently and irregularly.

Therefore, a fixed mechanism should not be used to facilitate retrieval of recipe data. A mechanism for facilitating retrieval of recipe data must work flexibly for each user and dynamically for operation of each user.

In view of the above problems, it is an object of the present invention to enable a user to easily retrieve contents data such as stored recipe data.

DISCLOSURE OF THE INVENTION

In order to achieve the above object, a terminal device according to the present invention has the functions of receiving contents data from a server via a communication network, storing the received contents data in a recording medium, and updating contents hierarchical information stored in the recording medium with reference to overall hierarchical information so that the newly stored contents data is included in the contents hierarchical information. The contents hierarchical information indicates classified levels of contents data based on retrieval keys. The overall hierarchical information indicates a hierarchical relation of the retrieval keys in the whole contents.

According to the present invention, when the terminal device stores the received contents data in the recording medium, the contents hierarchical information stored in the recording medium is updated with reference to the overall hierarchical information so that the newly stored contents data is included in the contents hierarchical information. This ensures that the contents hierarchical information stored in the recording medium always accurately indicates currently stored contents data. Accordingly, by conducting retrieve operation according to the classified levels of such accurate contents hierarchical information, the user can easily find desired contents data.

Preferably, the contents data is data for cooking, and the retrieval keys are ingredients used for cooking.

Preferably, when the number of elements under any one of the retrieval keys exceeds an upper limit in the updated contents hierarchical information, the terminal device further updates the contents hierarchical information so that the number of elements under that retrieval key becomes equal to or less than the upper limit.

Preferably, when the number of elements at any one of the levels becomes equal to or less than an upper limit in the updated contents hierarchical information, the terminal device deletes a level above that level from the contents hierarchical information.

Preferably, the upper limit in the terminal device is determined based on a size of a display screen of the terminal device itself or another equipment which receives contents data via the recording medium.

A server according to the present invention has the functions of receiving a request to transmit contents data from a terminal device via a communication network, receiving contents hierarchical information from the terminal device, updating the received contents hierarchical information with reference to overall hierarchical information so that the requested contents data is included in the contents hierarchical information, and transmitting the updated contents hierarchical information and the requested contents data to the terminal device. The contents hierarchical information indicates classified levels of contents data based on retrieval keys. The overall hierarchical information indicates a hierarchical relation of the retrieval keys in the whole contents.

According to the present invention, when the server receives a request to transmit contents data, the server updates the received contents hierarchical information with reference to the overall hierarchical information so that the requested contents data is included in the contents hierarchical information. The server then transmits the updated contents hierarchical information and the requested contents data to the terminal device. This ensures that the contents hierarchical information stored in the terminal device always accurately indicates the received contents data. Accordingly, by conducting retrieve operation according to the classified levels of such accurate contents hierarchical information, the user can easily find desired contents data.

A server according to the present invention has the functions of receiving a request to transmit contents data from a terminal device via a communication network, receiving identifier information of contents data from the terminal device, generating contents hierarchical information with reference to overall hierarchical information so that the requested contents data and the contents data indicated by the identifier information are included in the contents hierarchical information, and transmitting the generated contents hierarchical information and the requested contents data to the terminal device. The contents hierarchical information indicates classified levels of contents data based on retrieval keys. The overall hierarchical information indicates a hierarchical relation of the retrieval keys in the whole contents.

According to the present invention, when the server receives a request to transmit contents data, the server generates contents hierarchical information with reference to the overall hierarchical information so that the requested contents data and the contents data indicated by the received identifier information are included in the contents hierarchical information. The server then transmits the generated contents hierarchical information and the requested contents data to the terminal device. This ensures that the contents hierarchical information stored in the terminal device always accurately indicates the received contents data. Accordingly, by conducting retrieve operation according to the classified levels of such accurate contents hierarchical information, the user can easily find desired contents data.

Preferably, the contents data is data for cooking, and the retrieval keys are ingredients used for cooking.

In a method for storing contents data in a recording medium according to the present invention, the recording medium has contents hierarchical information which indicates classified levels of contents data recorded on the recording medium based on retrieval keys. When new contents data is added to the recording medium or contents data is deleted from the recording medium, the contents hierarchical information is updated with reference to general hierarchical information which indicates a hierarchical relation of the retrieval keys in the whole contents.

According to the present invention, when new contents data is added or contents data is deleted, the contents hierarchical information stored in the recording medium is updated with reference to the overall hierarchical information. This ensures that the contents hierarchical information stored in the terminal device always accurately indicates currently stored contents data. Accordingly, by conducting retrieve operation according to the classified levels of such accurate contents hierarchical information, the user can easily find desired contents data.

Preferably, in the above method, adding new contents data to the recording medium includes a first step of determining whether or not the contents hierarchical information has a retrieval key associated with the contents data, and if the contents hierarchical information has the retrieval key, allocating the contents data to the retrieval key, a second step of, if the contents hierarchical information does not have the retrieval key in the first step, retrieving the retrieval key from the overall hierarchical information and retrieving a root key of the retrieval key, and a third step of determining whether or not the contents hierarchical information has the root key, and if the contents hierarchical information has the root key, allocating the contents data to the root key.

Preferably, in the above method, deleting contents data from the recording medium includes a first step of retrieving a retrieval key of the contents data from the contents hierarchical information and specifying a root key of the retrieval key, a second step of determining whether or not the number of remaining child keys of the root key is one, a third step of, if the number of remaining child keys is one in the second step, deleting the root key and attaching the remaining child key to a root key of the root key, and a fourth step of deleting the contents data and the retrieval key from the contents hierarchical information.

In a program for causing a computer to conduct a method for storing contents data in a recording medium according to the present invention, the recording medium has contents hierarchical information which indicates classified levels of contents data recorded on the recording medium based on retrieval keys. The program causes the computer to conduct a first process of adding new contents data to the recording medium or deleting contents data from the recording medium, and a second process of updating, in the first process, the contents hierarchical information with reference to general hierarchical information which indicates a hierarchical relation of the retrieval keys in the whole contents.

Preferably, the contents data are data for cooking, and the retrieval keys are ingredients used for cooking.

Preferably, when new contents data is added to the recording medium in the first process, the program causes the computer to conduct a first step of determining whether or not the contents hierarchical information has a retrieval key associated with the contents data, and if the contents hierarchical information has the retrieval key, allocating the contents data to the retrieval key, a second step of, if the contents hierarchical information does not have the retrieval key in the first step, retrieving the retrieval key from the overall hierarchical information and retrieving a root key of the retrieval key, and a third step of determining whether or not the contents hierarchical information has the root key, and if the contents hierarchical information has the root key, allocating the contents data to the root key.

Preferably, if the contents hierarchical information does not have the root key in the third step, the program causes the computer to conduct the step of determining whether or not the contents hierarchical information has any one of child keys of the root key, and if the contents hierarchical information has any one of child keys of the root key, inserting the root key above the child key, adding the retrieval key under the root key, and allocating the contents data to the retrieval key.

Preferably, when the number of contents data per retrieval key exceeds a predetermined value, the program causes the computer to conduct the step of allocating these contents data to a plurality of sub keys separately.

Preferably, when contents data is deleted from the recording medium in the first process, the program causes the computer to conduct a first step of retrieving a retrieval key associated with the contents data from the contents hierarchical information and specifying a root key of the retrieval key, a second step of determining whether or not the number of remaining child keys of the root key is one, a third step of, if the number of remaining child keys is one in the second step, deleting the root key and attaching the remaining child key to a root key of the root key, and a fourth step of deleting the contents data and the retrieval key from the contents hierarchical information.

Preferably, when the number of elements under any one of the retrieval keys exceeds an upper limit in the updated contents hierarchical information, the program causes the computer to conduct a third process of further updating the contents hierarchical information so that the number of elements under that retrieval key becomes equal to or less than the upper limit.

Preferably, the third process includes the steps of removing the elements under the retrieval key from the retrieval key and dividing the removed elements into a plurality of groups, placing each of the plurality of element groups under a corresponding one of a plurality of new retrieval keys, and placing the plurality of new retrieval keys under the retrieval key.

Preferably, the third process includes the steps of removing the elements under the retrieval key from the retrieval key and dividing the removed elements into a plurality of groups, placing each of the plurality of element groups under a corresponding one of a plurality of new retrieval keys, and replacing the retrieval key with the plurality of new retrieval keys.

Preferably, when the number of elements at any one of the levels becomes equal to or less than an upper limit in the updated contents hierarchical information, the program causes the computer to conduct a process of deleting a level above that level from the contents hierarchical information.

BRIEF DESCRIPTION OF THE DRAWINGS

FIG. 6 shows another example of updating recipe hierarchical information;

BEST MODE FOR CARRYING OUT THE INVENTION

Hereinafter, embodiments of the present invention will be described with reference to the accompanying drawings.

First Embodiment

Figure 1:
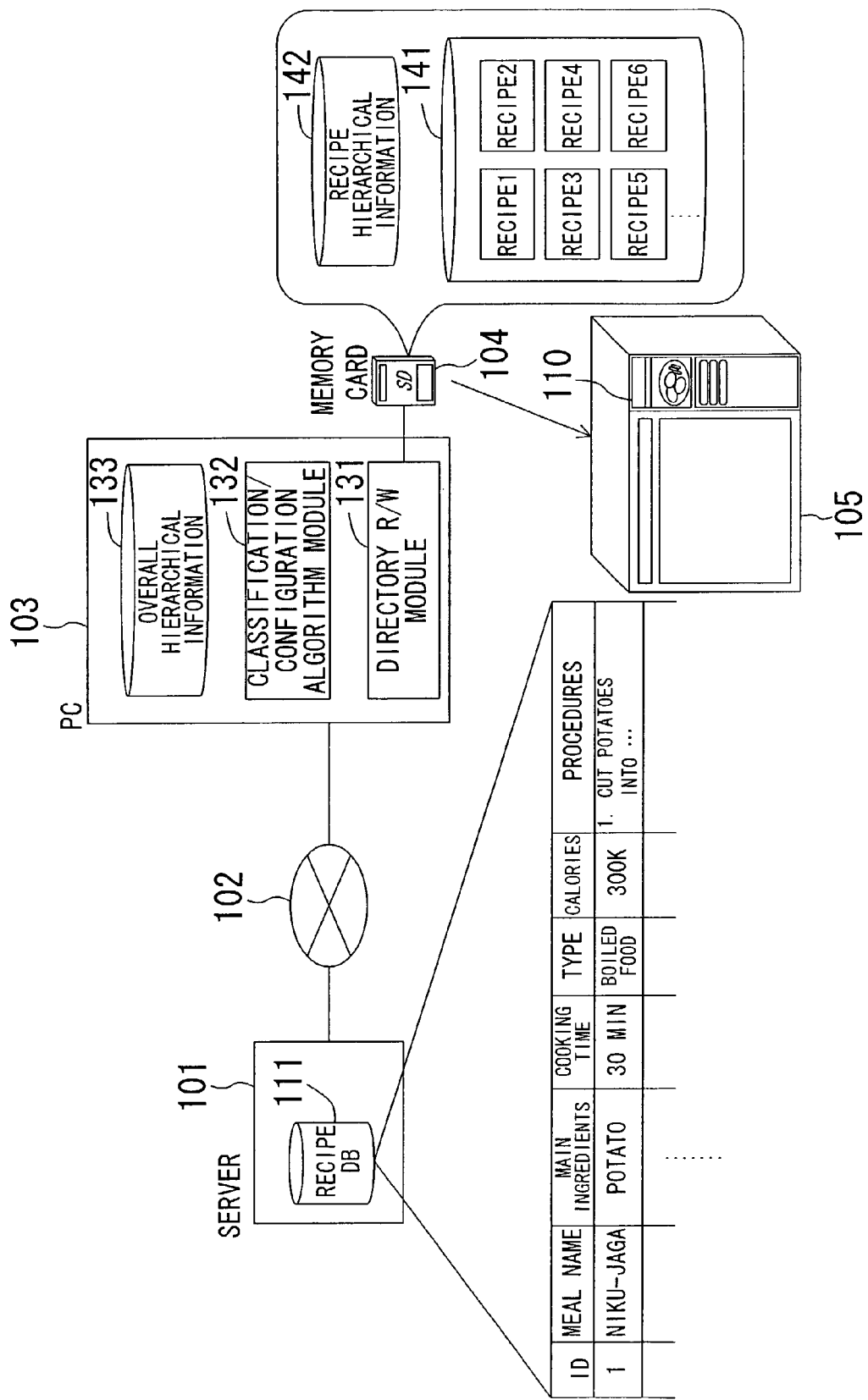
FIG. 1 schematically shows the structure of an information transmission system according to an embodiment of the present invention.

FIG. 1 schematically shows the overall structure of an information transmission system according to the first embodiment of the present invention. The information communication system of FIG. 1 implements a method for storing contents data according to the present embodiment. In FIG. 1, 101 denotes a server for controlling services such as providing recipe data, 102 denotes a communication network such as the Internet, 103 denotes a personal computer (PC) serving as a terminal device, 104 denotes a semiconductor memory card like an SD card as a recording medium, and 105 denotes a microwave oven as a cooking appliance.

The server 101 includes a recipe DB (database) 111 storing a plurality of recipe data to be supplied to the users. Each recipe data has various files such as a cooking data file regarding temperature setting and output of a cooking appliance during cooking, a document file for displaying cooking procedures, required ingredients, quantities and the like on a screen, and an image file including a finished image of a meal prepared according to the recipe and an image for giving advice about cooking.

The microwave oven 105 is structured so that the semiconductor memory card 104 can be mounted thereto. The microwave oven 105 has a liquid crystal screen 110 for displaying cooking procedures and the like. The semiconductor memory card 104 serves to supply recipe data received by the personal computer 103 to the microwave oven 105.

The personal computer 103 includes a directory R/W module 131, a classification/configuration algorithm module 132, and overall hierarchical information 133 indicating the hierarchical relation of retrieval keys in the entire recipes. The semiconductor memory card 104 includes a recipe storing section 141 for storing downloaded recipe data, and recipe hierarchical information 142 serving as contents hierarchical information indicating classified levels of recipe data based on the retrieval keys.

The directory R/W module 131 of the personal computer 103 stores recipe data received from the server 101 via the communication network 102 in the memory card 104. The classification/configuration algorithm module 132 reads recipe hierarchical information 142 from the memory card 104, and updates the recipe hierarchical information 142 with reference to the overall hierarchical information 133 so that recipe data to be added is included in the recipe hierarchical information 142. The classification/configuration algorithm module 132 then stores the updated recipe hierarchical information 142 in the memory card 104. This classification/configuration algorithm module 132 corresponds to a program for causing the computer to conduct the method for storing contents data according to the present invention.

Figure 2:
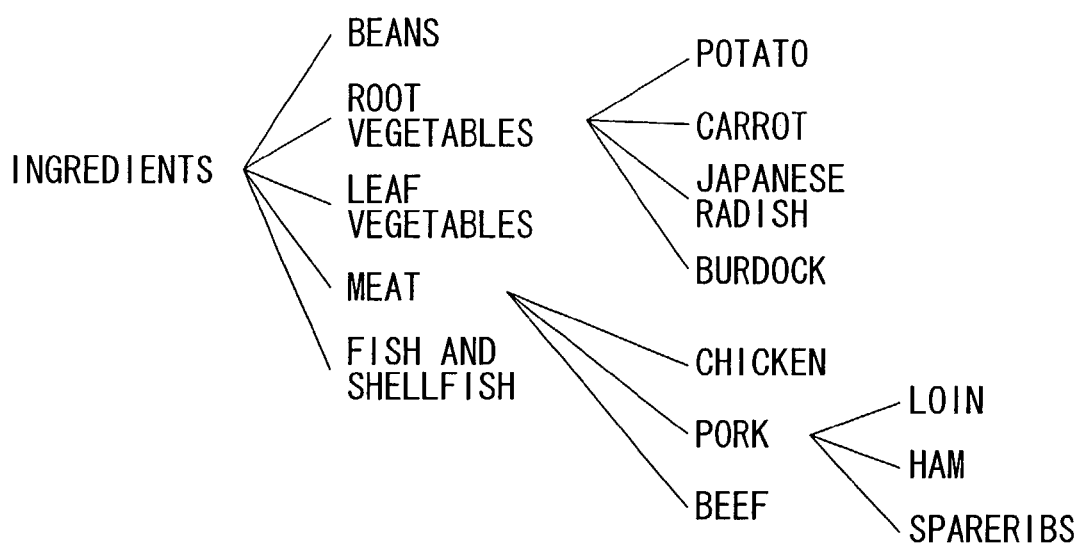
FIG. 2 shows an example of overall hierarchical information according to a first embodiment of the present invention.

FIG. 2 shows an example of the overall hierarchical information 133 according to the present embodiment. In the example of FIG. 2, "ingredients" is used as a retrieval key of each recipe. More specifically, "ingredients" is placed at the highest level, i.e., a first level, and "beans", "root vegetables", "leaf vegetables", "meat" and "fish and shellfish" are placed at a second level. Moreover, "potato", "carrot", "Japanese radish" and "burdock" are placed at a third level under "root vegetables", and "chicken", "pork" and "beef" are placed at the third level under "meat". Moreover, "loin", "ham" and "spareribs" are placed at a fourth level under "pork".

The reason why "ingredients" is used as a retrieval key of recipe data is as follows: For example, retrieving recipe data by "meal name" complicates the operation of inputting characters. Moreover, each meal has various names depending on the areas and the households (e.g., "curry and rice" and "rice and curry"). Therefore, the input meal name does not always match the meal name stored in the system, which may possibly degrade convenience. It is of course possible to add a function to retrieve recipe data by inference, and the like.

However, adding such a complex function is not preferable due to the hardware limitations on the cooking appliance (e.g., it is difficult to mount a keyboard, the screen size is small, the number of buttons is limited, and the like). On the other hand, retrieving recipe data by "ingredients" simplifies the operation of inputting characters by the user. Moreover, there are only a limited number of ingredients. Therefore, the system structure of the cooking appliance is also simplified. In addition, retrieving recipe data by "ingredients" may greatly help the user think of a meal from leftovers in the refrigerator, bargain foods at a supermarket and the like.

It should be understood that, in addition to "ingredients", a kind of food (Japanese food, Western food, and Chinese food; boil, broil/roast/grill, and fry; and the like), cooking time (easiness), nutriment, calories, the amount of salt, costs, season, or the like may be used as a retrieval key.

[Process of Adding a Recipe]

Figure 3:
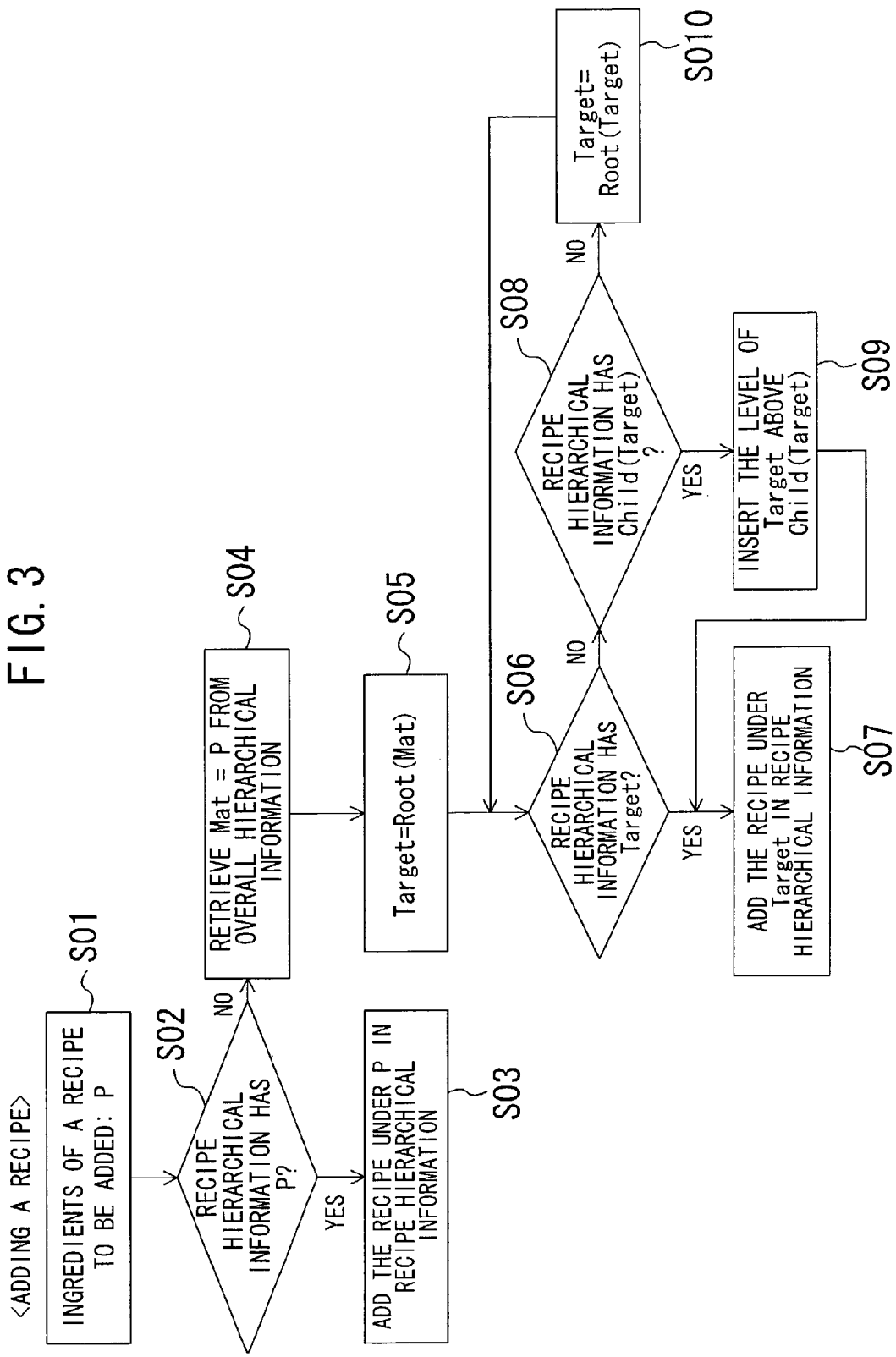
FIG. 3 is a flowchart of a process of adding recipe data according to the first embodiment of the present invention.
Figure 4:
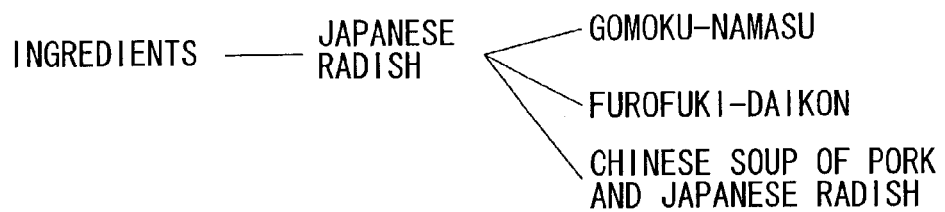
FIG. 4 shows an example of recipe hierarchical information before updating.

FIG. 3 is a flowchart of a process of adding recipe data. It is herein assumed that only three recipes for Japanese radish, i.e., "strips of various vegetables marinated in vinegar (a Japanese food called "Gomoku-namasu")", "slices of boiled Japanese radish with sweet miso (fermented soybean paste) (a Japanese food called "Furofuki-daikon")" and "Chinese soup of pork and Japanese radish", are stored in the memory card 104. In this case, the memory card 104 has recipe hierarchical information 142 as shown in FIG. 4.

In this state, recipe data for "strings of carrot fried and boiled down in sugar and soy sauce (a Japanese food called "Ninjin no Kinpira")" (ingredients: carrot) is added to the memory card 104. Since the ingredients of "Ninjin no Kinpira" is "carrot", P="carrot" (S01).

It is then determined whether the recipe hierarchical information 142 in the memory card 104 has P or not (S02). If the recipe hierarchical information 142 has P, new recipe data is added under P in the recipe hierarchical information 142 (S03). In this example, the recipe hierarchical information 142 does not have P (carrot) (NO in S02). Therefore, the routine proceeds to step S04.

In step S04, P is retrieved from the overall hierarchical information 133 in the personal computer 103. A category name Root(Mat) at the level above an ingredient Mat defined by Mat=P, that is, an ingredient as a root key of P, is defined as Target (S05). Based on the overall hierarchical information of FIG. 2, "root vegetables" at the level above "carrot" is herein defined as Target.

It is then determined whether the recipe hierarchical information 142 has Target or not (S06). If the recipe hierarchical information 142 has Target, new recipe data is added under Target in the recipe hierarchical information 142 (S07). In this example, the recipe hierarchical information 142 does not have Target (root vegetables) (NO in S06), the routine proceeds to step S08.

In step S08, it is determined whether or not the recipe hierarchical information 142 has any of the child keys of Target, i.e., Child(Target). If the recipe hierarchical information 142 does not have any of the child keys Child(Target) (NO in S08), a root key of Target, i.e., Root(Target), is defined as a new Target (S10), and the routine returns to step S06.

Figure 5:
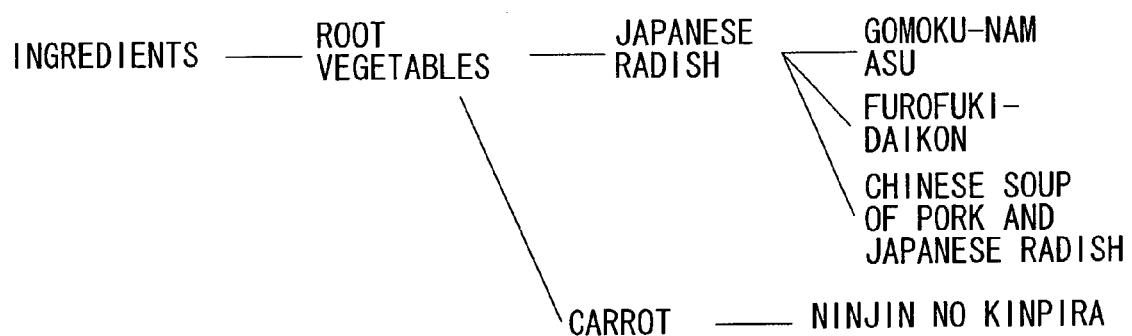
FIG. 5 shows updated recipe hierarchical information.

As can be seen from the overall hierarchical information of FIG. 2, "potato", "carrot", "Japanese radish" and "burdock" correspond to the child keys of "root vegetables". In step S08, it is determined whether the recipe hierarchical information 142 in the memory card 104 has these ingredients or not. It can be seen from FIG. 4 that the recipe hierarchical information 142 has "Japanese radish". Therefore, the level of Target, i.e., the level of "root vegetables", is inserted above "Japanese radish", i.e., the child key included in the recipe hierarchical information 142 (S09), and new recipe data for "Ninjin no Kinpira" is then added under "root vegetables" (S07). As a result, the recipe hierarchical information is updated as shown in FIG. 5.

If the recipe hierarchical information before updating is as shown in FIG. 6(a), the recipe hierarchical information does not have "carrot", but has "root vegetables". Therefore, the determination result of step S06 is "Yes", and "carrot" and "Ninjin no Kinpira" are added under "root vegetables". The recipe hierarchical information is thus updated as shown in FIG. 6(b).

[Process of Deleting a Recipe]

Figure 7:
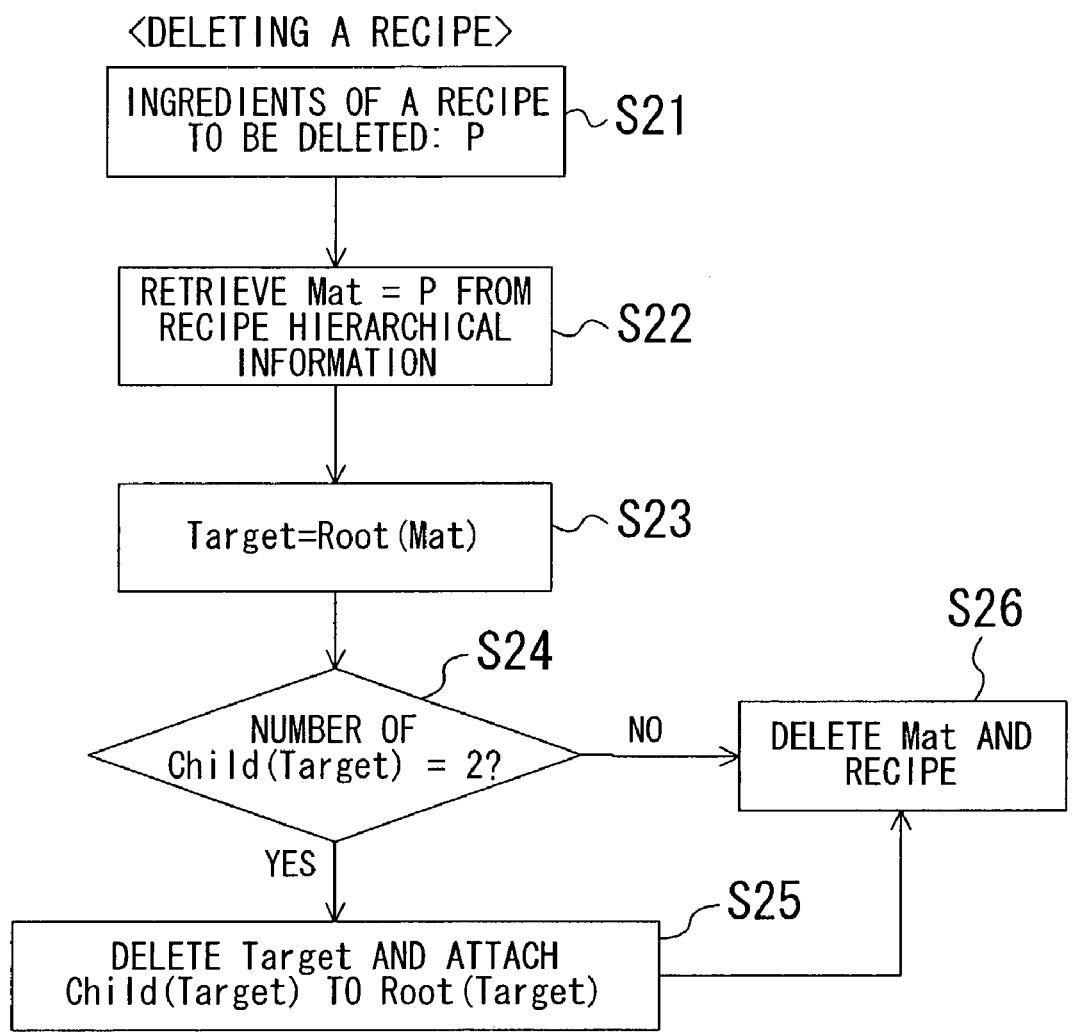
FIG. 7 is a flowchart of a process of deleting recipe data according to the first embodiment of the present invention.

FIG. 7 is a flowchart of a process of deleting recipe data. The process of deleting recipe data may either be spontaneously conducted by the user or automatically conducted based on the remaining capacity of the memory card 104, the date of each recipe data, and the like.

It is now assumed that adding a recipe A to the memory card 104 (with a memory capacity of, e.g., 64 megabytes) is impossible because the remaining memory capacity is not large enough. In this case, a recipe Z written on the least recent date is selected from the recipe data stored in the memory card 104, and a message to delete the recipe Z is presented to the user. If the user accepts deletion of the recipe Z, a process of deleting the recipe Z is conducted. If the date the user viewed a recipe is stored in the memory card, the recipe which was viewed on the least recent date may be selected as a recipe to be deleted. If the number of times the user has viewed a recipe is stored in the memory card, the recipe which has been viewed the smallest number of times may be selected as a recipe to be deleted.

It is now assumed that three recipes for Japanese radish, i.e., "Gomoku-namasu", "Furofuki-daikon" and "Chinese soup of pork and Japanese radish", and "Ninjin no Kinpira" are stored in the memory card 104. In this case, the recipe hierarchical information 142 in the memory card 104 is as shown in FIG. 5.

In this state, the recipe data for "Ninjin no Kinpira" (ingredients: carrot) is deleted from the memory card 104. Since the ingredients of "Ninjin no Kinpira" is "carrot", P="carrot" (S21).

In step S22, P is retrieved from the recipe hierarchical information 142. A category name Root(Mat) at the level above an ingredient Mat defined by Mat=P, that is, an ingredient as a root key of P, is defined as Target (S23). Based on the recipe hierarchical information of FIG. 5, "root vegetables" at the level above "carrot" is herein defined as Target.

It is then determined whether the number of child keys of Target, i.e., the number of child keys "Child(Target), is two or not. In other words, it is determined whether the number of child keys other than "carrot" is one or not. If the number of child keys other than "carrot" is not one (No in S24), Mat (=P) and the recipe data are deleted (S26). In this example, the number of child keys other than "carrot" is one ("Japanese radish") (Yes in S24). Therefore, the routine proceeds to step S25, where Target is deleted and the remaining child key, i.e., "Japanese radish", is attached to a root key of Target (in this example, "ingredients"). Thereafter, "carrot" and "Ninjin no Kinpira" are deleted (S26). As a result, the recipe hierarchical information is updated as shown in FIG. 4.

In the above processes of adding and deleting a recipe, if only one ingredient is present under a certain category, this category is omitted. This feature is implemented especially by steps S08, S09, S10 of the process of adding a recipe and steps S24, S25 of the process of deleting a recipe. This prevents the number of levels from being increased unnecessarily, and thus enables improvement in retrieve operation speed.

If the number of recipes for any one of the ingredients is increased by adding a recipe, these recipe data may be allocated to a plurality of sub keys. For example, it is now assumed that the microwave oven 105 can display only eight meals on the liquid crystal screen 110 at a time. In this case, if the number of recipe data per retrieval key exceeds eight, these recipe data are allocated to a plurality of sub keys. This prevents the recipes of a single category from being displayed over a plurality of pages. As a result, the user can view the recipe more easily. The sub keys include a kind of food (Japanese food, Western food, and Chinese food; boil, broil/roast/grill, and fry; and the like), easiness of the recipes (cooking time and the like), nutriment, calories, the amount of salt, costs, season, and the like. Adding such sub keys to each recipe data in advance facilitates the processing.

The number of recipe data for each ingredient may be displayed on the screen. For example, in the case of the recipe hierarchical information of FIG. 4, "Japanese radish (3)" is displayed on the screen. This allows the user to know the number of recipes without changing the page of the display.

Each recipe normally includes a plurality of ingredients. Therefore, a plurality of ingredients may be used as a retrieval key. For example, for "boiled potatoes and meat (a Japanese food called "Niku-jaga")", "beef" and "potato" may be used as a retrieval key, and recipe data for "Niku-jaga" may be attached to each of "beef" and "potato". In the case where recipe data having a plurality of ingredients as a retrieval data is retrieved using a certain ingredient, it is preferable to allow the user to return not only to the certain ingredient but also to the levels of the remaining ingredients. For example, if "Niku-jaga" is retrieved using "beef", the user is preferably allowed to return to either "beef" or "potato".

As has been described above, according to the present embodiment, the recipe hierarchical information is updated with reference to the overall hierarchical information upon adding new recipe data or deleting recipe data. This ensures that the recipe hierarchical information stored in a recording medium always accurately indicates currently stored recipe data. Accordingly, by conducting retrieve operation according to the classified levels of such accurate recipe hierarchical information, the user can easily find desired recipe data.

Note that the microwave oven 105 is herein used as a cooking appliance. However, the present invention is not limited to this. For example, a rice cooker, an IH cooking heater, a refrigerator, a toaster oven or the like may be used as a cooking appliance. The overall hierarchical information 133 may be stored in the semiconductor memory card 104 instead of the personal computer 103.

In the present embodiment, data exchange between a terminal device and a cooking appliance is conducted using a semiconductor memory card like a SD card as a recording medium. However, another recording medium such as a floppy disk or DVD-RAM may alternatively be used.

Data exchange between a terminal device and a cooking appliance may be conducted using a physical communication network (wired or wireless) instead of the recording medium. It is expected that a home LAN will be increasingly widespread and cooking appliances will be connected to the home LAN as information appliances. If a cooking appliance itself has a communication function, this cooking appliance can be used as a terminal device. In this case, the cooking appliance can exchange data directly with a server. In this case, an internal memory, a hard disk or the like of the cooking appliance and the terminal device corresponds to a recording medium in the present invention.

(Modification)

In the above embodiment, the personal computer 103 serving as a terminal device updates the recipe hierarchical information. If a terminal device such as a telephone and a facsimile machine does not have such a data processing function as described above, the server may update the recipe hierarchical information.

Figure 8:
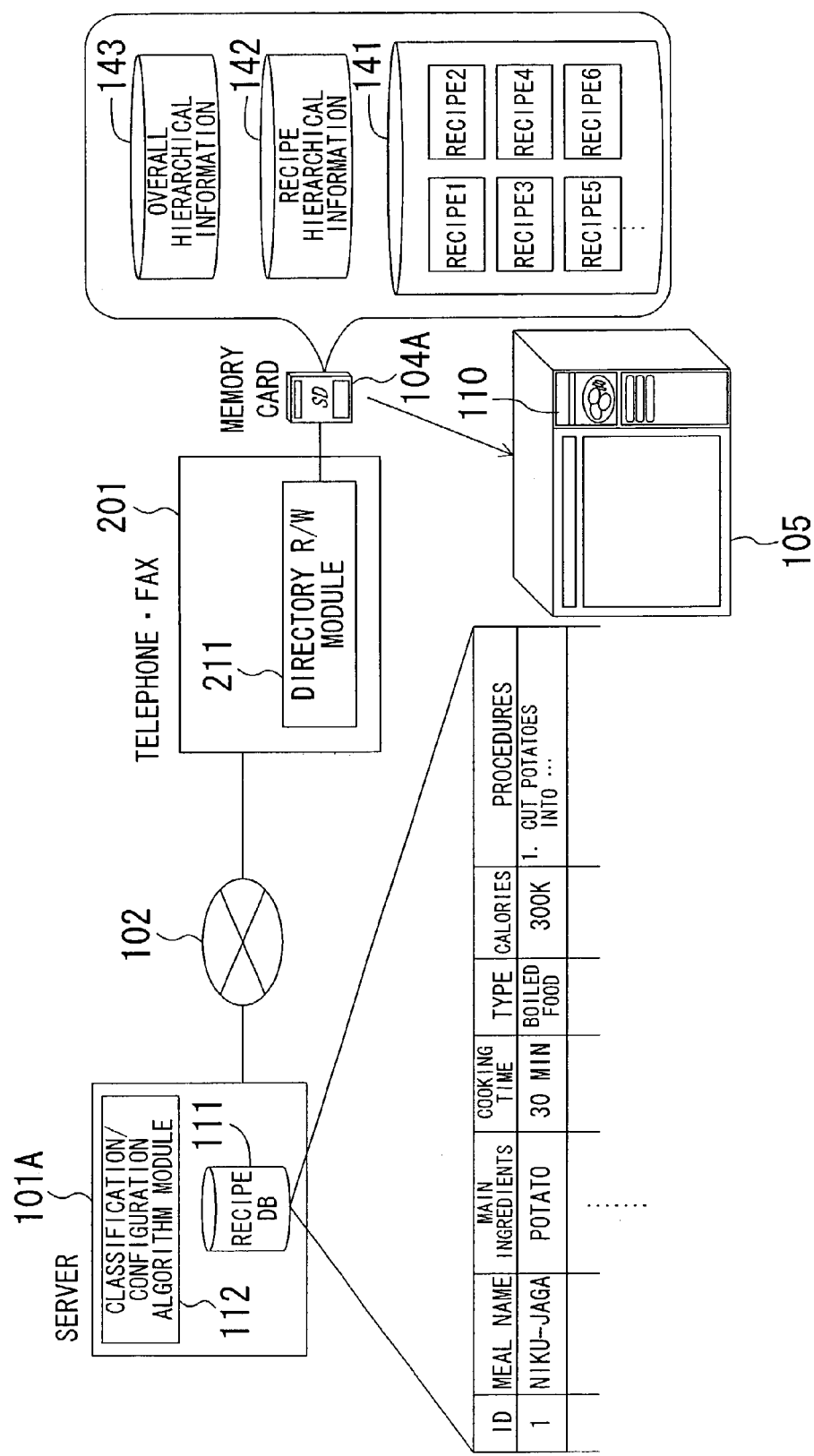
FIG. 8 schematically shows another structure of the information transmission system according to an embodiment of the present invention.

FIG. 8 schematically shows another structure of the information transmission system according to an embodiment of the present invention. In FIG. 8, the same components as those of FIG. 1 are denoted with the same reference numerals, and detailed description thereof is omitted. In the structure of FIG. 8, a terminal device 201 such as a telephone and a facsimile machine receives recipe data from a server 101A.

The server 101A includes a classification/configuration algorithm module 112 in addition TO the recipe DB 111. A semiconductor memory card 104A includes overall hierarchical information 143 in addition to the recipe storing section 141 for storing downloaded recipe data and the recipe hierarchical information 142.

The terminal device 201 transmits to the server 101A the recipe hierarchical information 142 and the overall hierarchical information 143 which are stored in the memory card 104A, together with a request to transmit recipe data. The server 101A receives the request to transmit recipe data from the terminal device 201 via the communication network 102. At the same time, the server 101A receives the recipe hierarchical information 142 and the overall hierarchical information 143 transmitted from the terminal device 201.

The classification/configuration algorithm module 112 in the server 101A updates the received recipe hierarchical information 142 with reference to the overall hierarchical information 143 so that the requested recipe data is included in the recipe hierarchical information 142. The server 101A then transmits the updated recipe hierarchical information 142 and the requested recipe data to the terminal device 201. The directory R/W module 211 of the terminal device 201 stores the recipe data received from the server 101A via the communication network 102 in the memory card 104A.

As has been described above, if the terminal device does not have a data processing function, the server itself is provided with a function to update the recipe hierarchical information. This enables appropriate recipe hierarchical information to be retained in the recording medium all the time. It should be understood that the server may update the recipe hierarchical information even if the terminal device has a data processing function.

In the above modification, the overall hierarchical information 143 is stored in the memory 104A. However, the overall hierarchical information 143 may alternatively be stored in the server 101A. This eliminates the need to transmit the overall hierarchical information 143 from the terminal device 201, and thus enables reduction in communication costs.

The recipe hierarchical information 142 may alternatively be updated by transmitting identifier information (e.g., data ID) indicating each recipe data recorded on the memory card 104A to the server 101, instead of transmitting the recipe hierarchical information 142 to the server 101A. In other words, the server 101A receives a request to transmit recipe data and identifier information indicating recipe data stored in the semiconductor memory card 104A from the terminal device 201. The server 101A then produces recipe hierarchical information which includes the requested recipe data and the recipe data indicated by the received identifier information. The server 101A then transmits the requested recipe data and the produced recipe hierarchical information to the terminal device 201. The terminal device 201 replaces the recipe hierarchical information 142 stored in the memory card with the received recipe hierarchical information. The recipe hierarchical information is thus updated.

Figure 23:
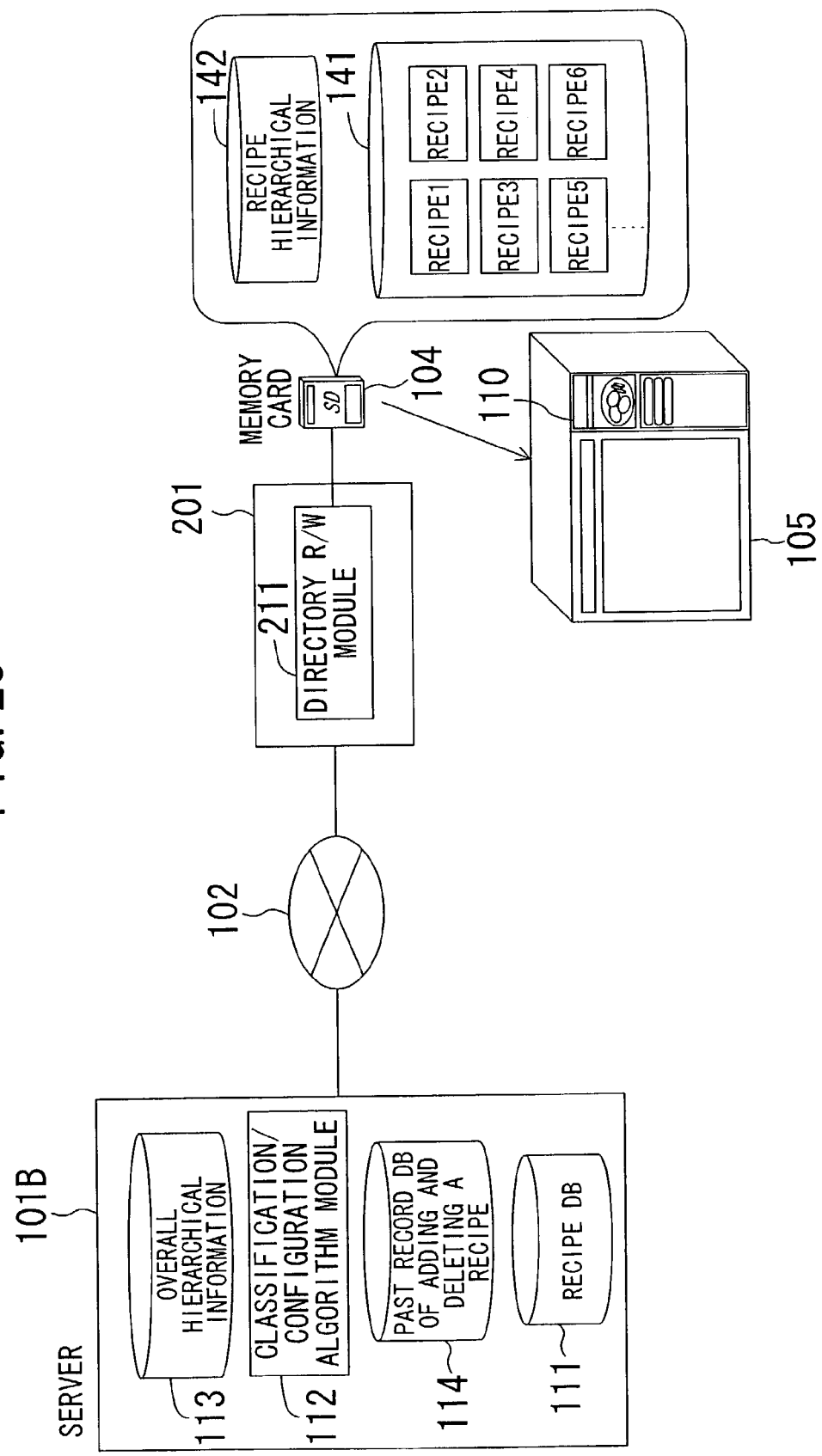
FIG. 23 shows the structure which is used when a server manages the past record of adding and deleting a recipe by a user.

As shown in FIG. 23, by storing in the server the past record of adding (downloading) and deleting a recipe by the user, the classified levels of the recipes stored in the memory card of the user can be managed all the time. In this case, even if the user loses the memory card, the data in the memory card can be restored based on the past record of editing (adding and deleting) a recipe in the memory card.

Second Embodiment

If a personal computer or a large-screen display device having a sufficient resolution has an interface equipment such as a mouse, a large amount of information can be confirmed at a time. However, cooking appliances such as a microwave oven and a rice cooker are originally intended for cooking. Therefore, the display portion of many cooking appliances is not large enough to display a large amount of information.

In order to enable the user to easily confirm a large amount of recipe information and the like by a cooking appliance, it is necessary to automatically classify the information and hold the classified information in such a form that can be easily viewed by the user. In the present embodiment, cooking data stored in a recording medium such as a memory card is automatically classified and stored in order to facilitate viewing and retrieval of the data.

Figure 9:
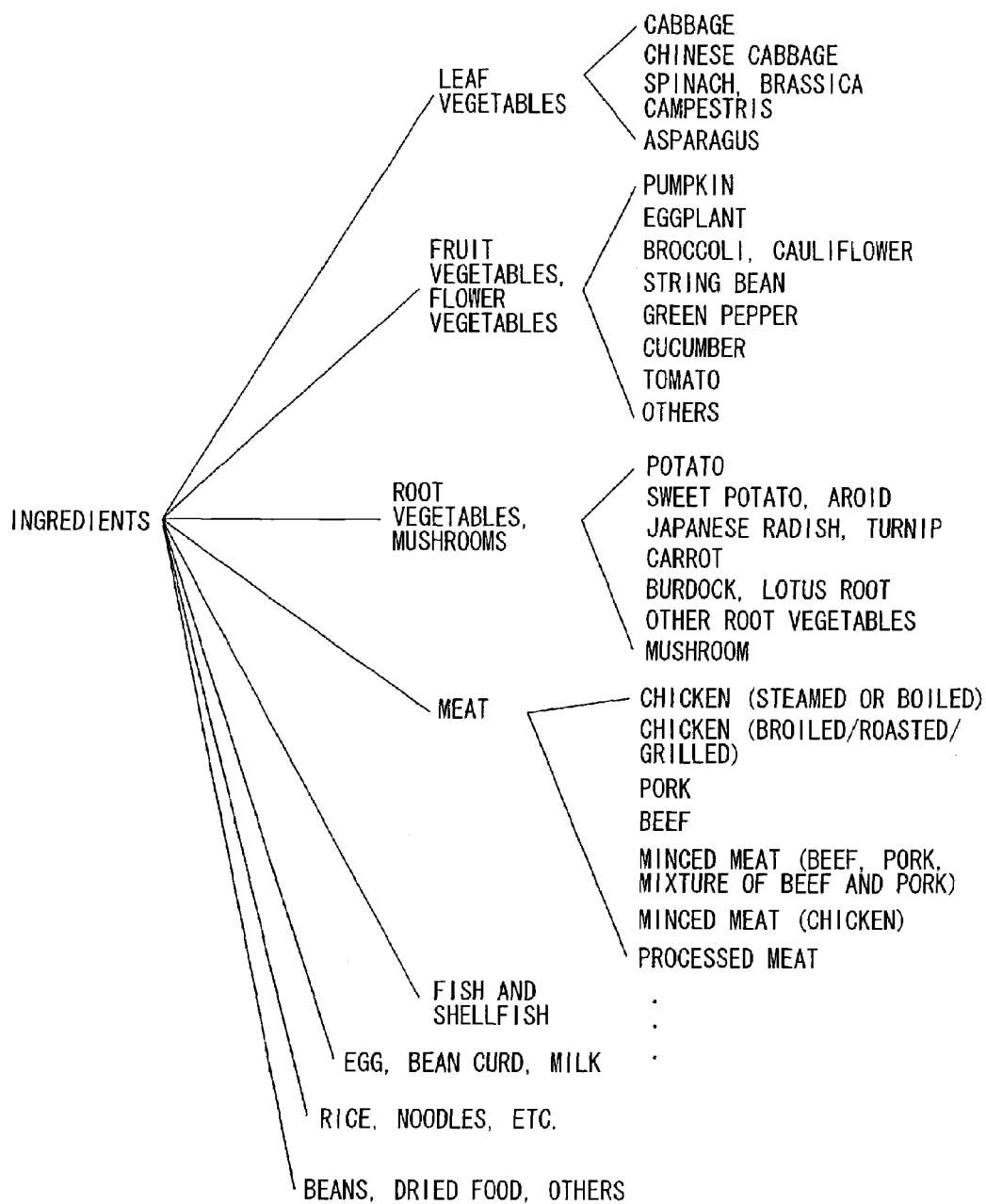
FIG. 9 shows an example of overall hierarchical information according to a second embodiment of the present invention.

An overall system of the present embodiment has the same structure as that of FIG. 1. It is herein assumed that the overall hierarchical information 133 regarding the ingredients shown in FIG. 9 is stored in the PC 103. FIG. 9 shows eight categories (retrieval keys) such as "leaf vegetables", "fruit vegetables, flower vegetables", "root vegetables, mushrooms" and "meat" as classified information of ingredients, and also shows specific ingredients under each retrieval key. For example, "leaf vegetables" includes the following four ingredients: "cabbage"; "Chinese cabbage"; "spinach, Brassica campestris"; and "asparagus". Recipe data is classified by using such overall hierarchical information of the ingredients.

[Process of Adding a Recipe]

Figure 10:
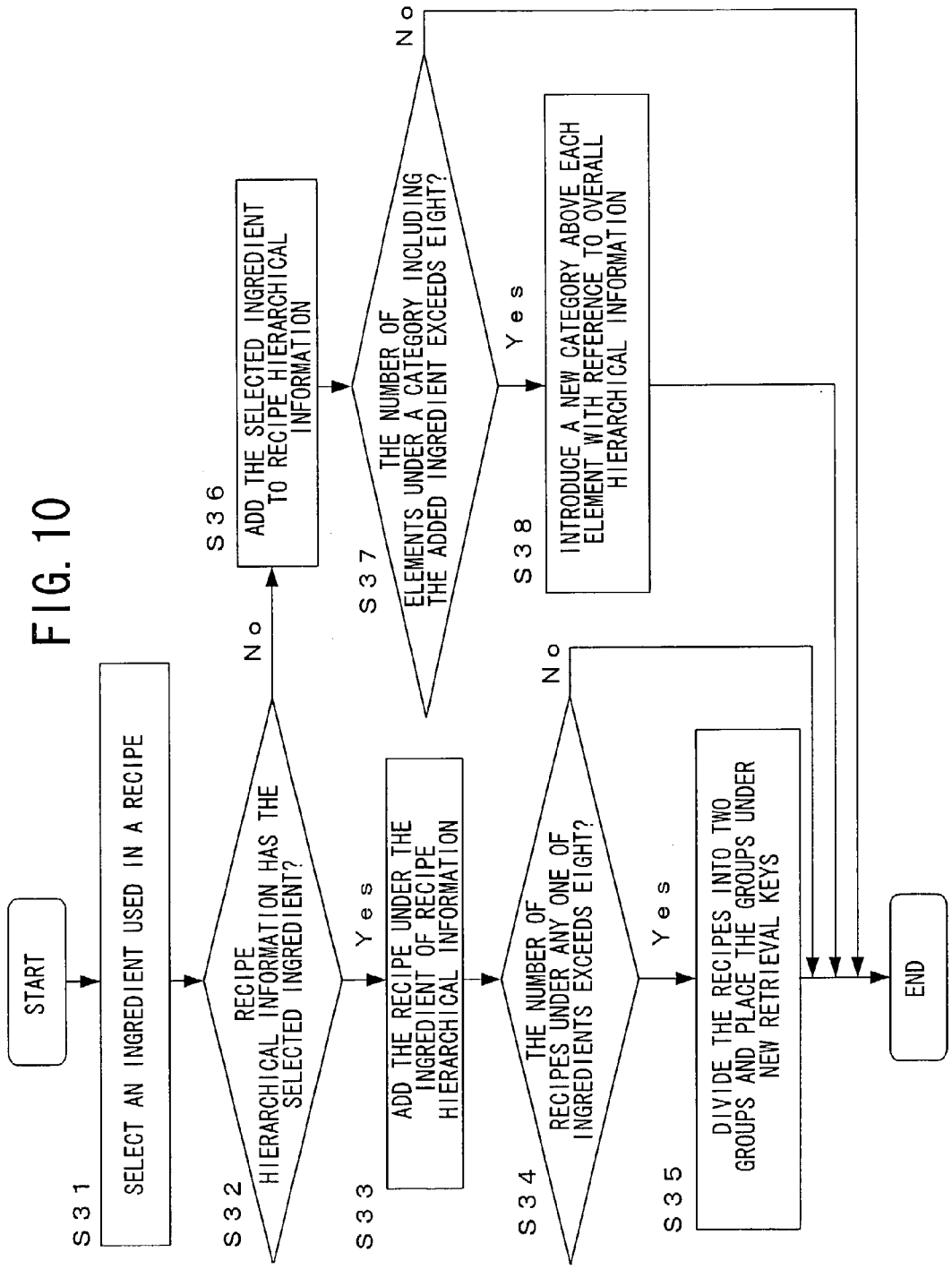
FIG. 10 is a flowchart of a process of adding recipe data according to the second embodiment of the present invention.
Figure 11:
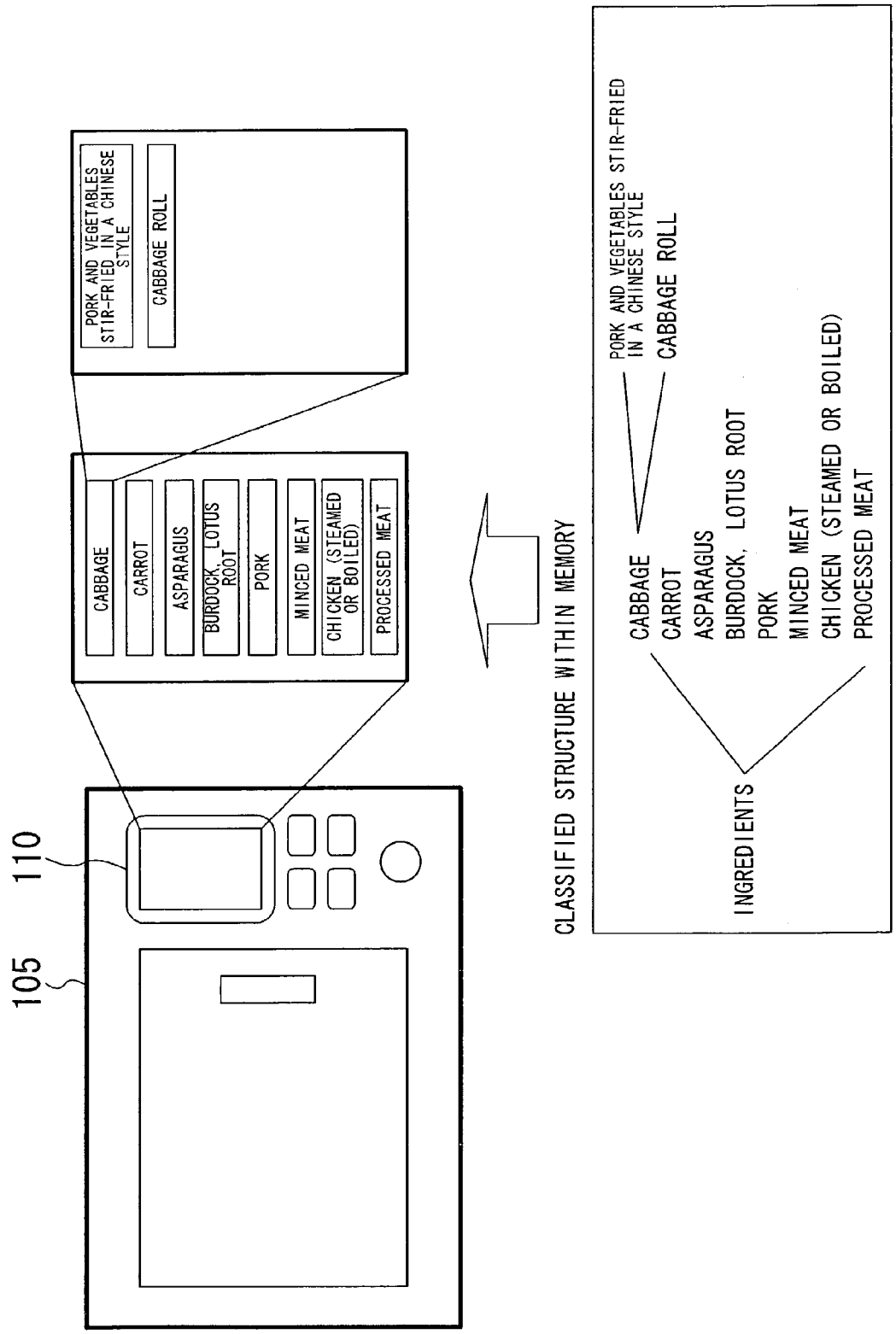
FIG. 11 shows an example of display on a screen of a microwave oven.

FIG. 10 is a flowchart of an algorithm for updating recipe hierarchical information in order to add recipe data. As shown in FIG. 11, it is herein assumed that the liquid crystal screen 110 of the microwave oven 105 is sized so that it can display only eight data at a time. Therefore, in the recipe hierarchical information 142, the number of elements per category must be equal to or less than eight. More specifically, if the number of elements under any one of the retrieval keys exceeds the upper limit (i.e., eight), the recipe hierarchical information 142 is further updated so that the number of elements under that retrieval key becomes equal to or less than eight.

It is now assumed that "pork and vegetables stir-fried in a Chinese style", which is one of the recipe data stored in the recipe DB 111, is downloaded from the server 101 to the PC 103.

Figure 12:
FIG. 12 shows an example of adding recipe data to recipe hierarchical information.

In this case, "cabbage" and "pork" are first selected as main ingredients of "pork and vegetables stir-fried in a Chinese style" (S31). The recipe hierarchical information 142 does not have the selected ingredients, i.e., "cabbage" and "pork" (No in S32). The routine then proceeds to step S36. In step S36, as shown in FIG. 12(*a*), the selected ingredients i.e., "cabbage" and "pork", are added under "ingredients", and "pork and vegetables stir-fried in a Chinese style" is added under each of "cabbage" and "pork". Since the number of elements under the category including the added elements "cabbage" and "pork" does not exceed eight (No in S37), execution of the algorithm is terminated.

Thereafter, "cabbage roll" is added as recipe data.

In this case, "cabbage" and "minced meat" are selected as main ingredients of "cabbage roll" (S31). Of the selected ingredients, "minced meat" is a new ingredient that is not included in the recipe hierarchical information 142. Therefore, "minced meat" is added under "ingredients", and "cabbage roll" is added under "minced meat" as in the case where "pork and vegetables stir-fried in a Chinese style" is added (S36 to S38). On the other hand, "cabbage" is already included in the recipe hierarchical information 142 (Yes in S32). Therefore, the routine proceeds to step S33, and "cabbage roll" is added under "cabbage" (S34). Since the number of recipe data under "cabbage" does not exceed eight (No in S34), execution of the algorithm is terminated. As a result, the recipe hierarchical information 142 is updated as shown in FIG. 12(*b*).

Thereafter, "chicken and vegetables stir-fried and boiled with soy sauce" (a Japanese food called "Chikuzen-ni") is added as recipe data. In this case, three ingredients, i.e., "carrot", "burdock, lotus root" and "chicken (steamed or boiled)", are selected as main ingredients (S31) and then added under "ingredients" as in the case of the algorithm described above. As a result, the recipe hierarchical information 142 is updated as shown in FIG. 12(*c*).

Figure 13:
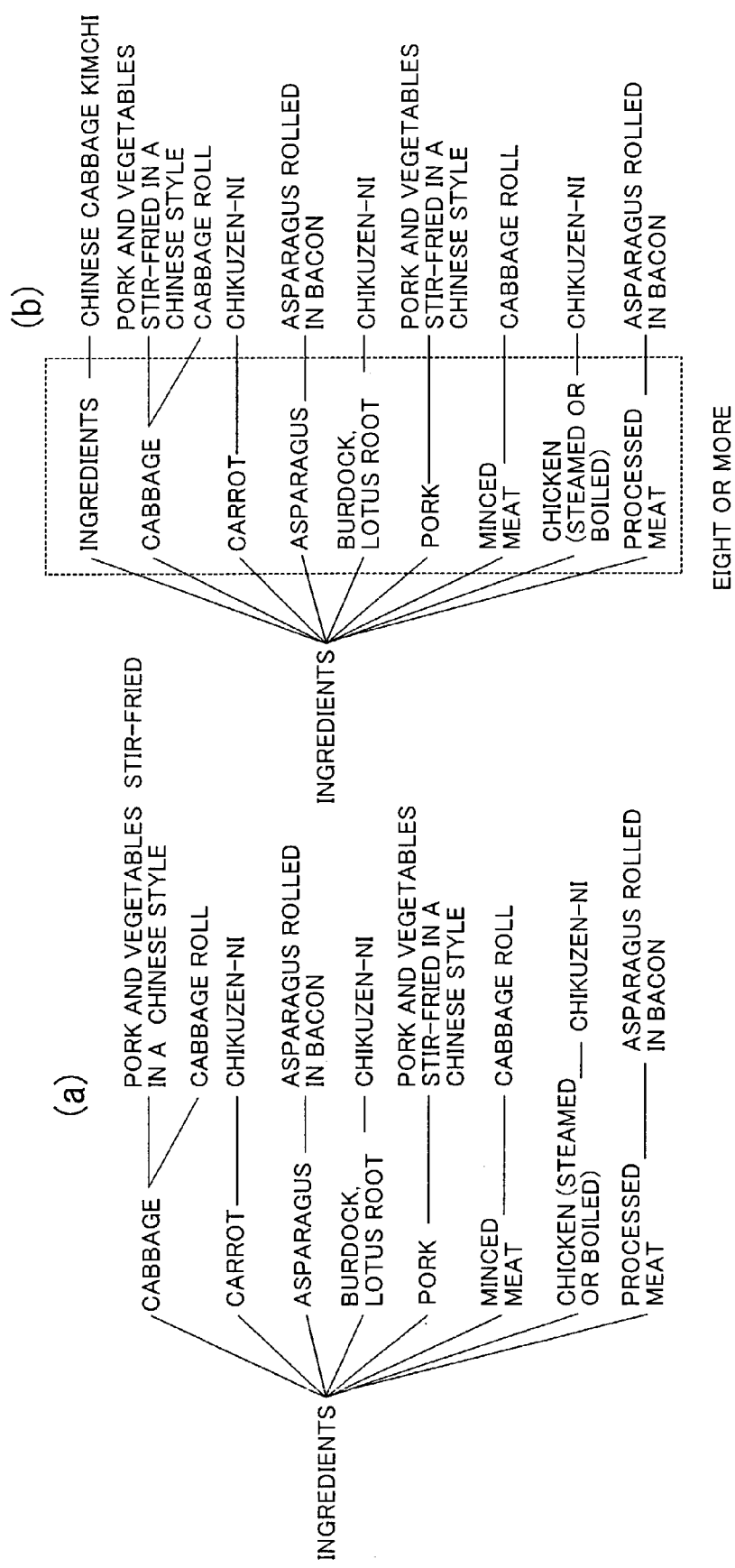
FIG. 13 shows the case where the number of elements exceeds an upper limit in recipe hierarchical information.

Thereafter, "asparagus rolled in bacon" is added as recipe data. In this case, two ingredients, i.e., "asparagus" and "processed meat", are selected as main ingredients (S31) and then added under "ingredients" as in the case of the algorithm described above. As a result, the recipe hierarchical information 142 is updated as shown in FIG. 13(*a*).

The number of elements under "ingredients" reaches eight, that is, "cabbage", "carrot", "asparagus", "burdock, lotus root", "pork", "minced meat", "chicken (steamed or boiled)" and "processed meat". Therefore, if a new ingredient is further added, the number of elements under "ingredients" exceeds the upper limit (i.e., eight). Accordingly, the recipe hierarchical information 142 is further updated. This process will now be described. It is herein assumed that "Chinese cabbage kimchi" ("kimchi" is a type of Korean pickles) is further added as recipe data.

First, "Chinese cabbage" is selected as a main ingredient of "Chinese cabbage kimchi" (S31). The selected ingredient, "Chinese cabbage", is a new ingredient which is not included in the recipe hierarchical information 142 (No in S32). Therefore, the routine proceeds to step S36, and "Chinese cabbage" is added under "ingredients" as shown in FIG. 13(*b*). As a result, the number of elements under "ingredients" reaches nine. Since the number of elements under "ingredients" exceeds the upper limit (i.e., eight) (Yes in S37), the routine proceeds to step S38.

Figure 14:
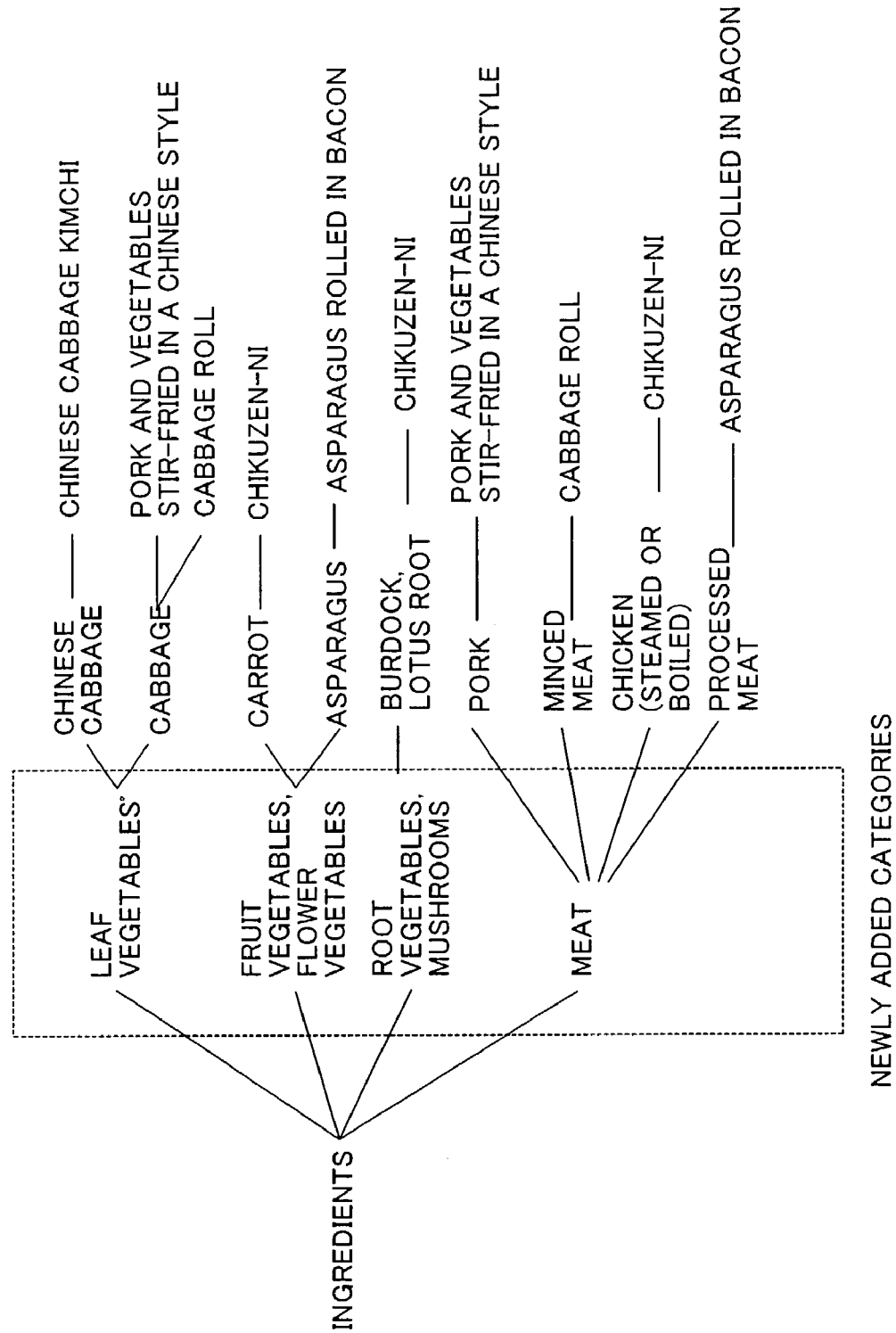
FIG. 14 shows an example of recipe hierarchical information having a level added thereto.

In step S38, the nine elements under "ingredients" are removed from "ingredients", and divided into the following groups with reference to the overall hierarchical information 133 of FIG. 9: the group of "Chinese cabbage" and "cabbage"; the group of "carrot" and "asparagus"; the group of "burdock, lotus root"; and the group of "pork", "minced meat", "chicken (steamed or boiled)" and "processed meat". Each of the element groups is placed under a corresponding one of the following new retrieval keys: "leaf vegetables"; "fruit vegetables, flower vegetables"; "root vegetables, mushrooms"; and "meat". Moreover, these new retrieval keys are placed under "ingredients". As a result, the recipe hierarchical information 142 having a single level added thereto is obtained as shown in FIG. 14. As can be seen from FIG. 14, the number of elements under each retrieval key does not exceed the upper limit (i.e., eight). Therefore, these elements can be appropriately displayed on the liquid crystal screen 110 of the microwave oven 105.

In the above example, when the number of elements under a certain retrieval key exceeds the upper limit, the recipe hierarchical information 142 is updated with reference to the overall hierarchical information 133 of FIG. 9 indicating the hierarchical relation of the ingredients. However, the recipe hierarchical information 142 may alternatively be updated without referencing to the overall hierarchical information 133.

Figure 15:
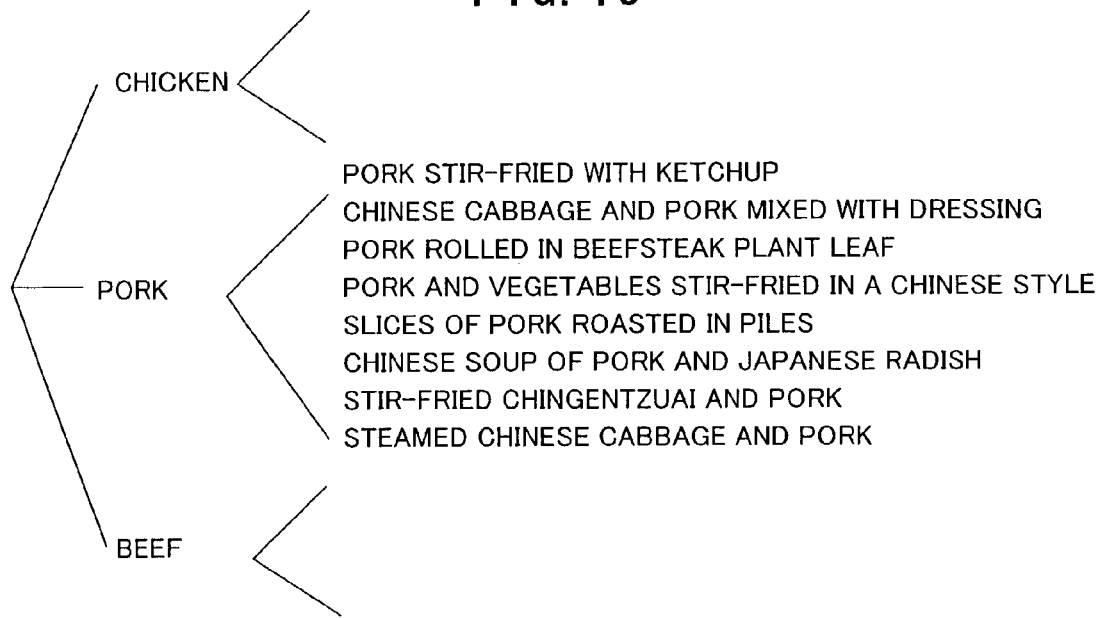
FIG. 15 shows an example of recipe hierarchical information before updating.

As shown in FIG. 15, it is now assumed that the recipe hierarchical information 142 has eight recipe data under "pork", and "fried pork" is added as recipe data regarding "pork". This process will now be described with reference to the flowchart of FIG. 10.

First, "pork" is selected as a main ingredient of "fried pork" (S31). Since the recipe hierarchical information 142 of FIG. 15 has "pork" (Yes in S32), the routine proceeds to step S33, and "fried pork" is added under "pork" in the recipe hierarchical information 142 of FIG. 15.

As a result, the number of recipe data using "pork" as an ingredient reaches nine. In other words, the number of recipe data using "pork" as an ingredient exceeds the upper limit (i.e., eight) (Yes in S34). Therefore, the routine proceeds to step S35. Thereafter, the recipe data under "pork" are removed from "pork" and divided into two groups.

Figure 16:
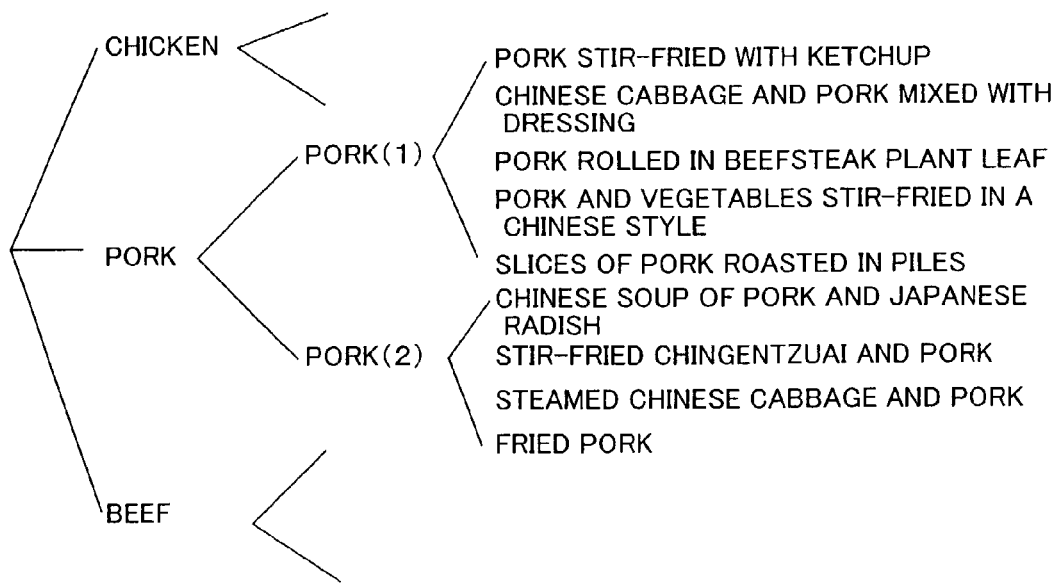
FIG. 16 shows an example of updated recipe hierarchical information of FIG. 15.

These two groups are respectively placed under the following new retrieval keys: "pork (1)"; and "pork (2)". Moreover, "pork (1)" and "pork (2)" are placed under "pork". As a result, the recipe hierarchical information 142 of FIG. 15 is updated as shown in FIG. 16 so that the number of elements per category does not exceed eight. This allows all recipe data under each retrieval key to be displayed on the screen at a time.

Figure 17:
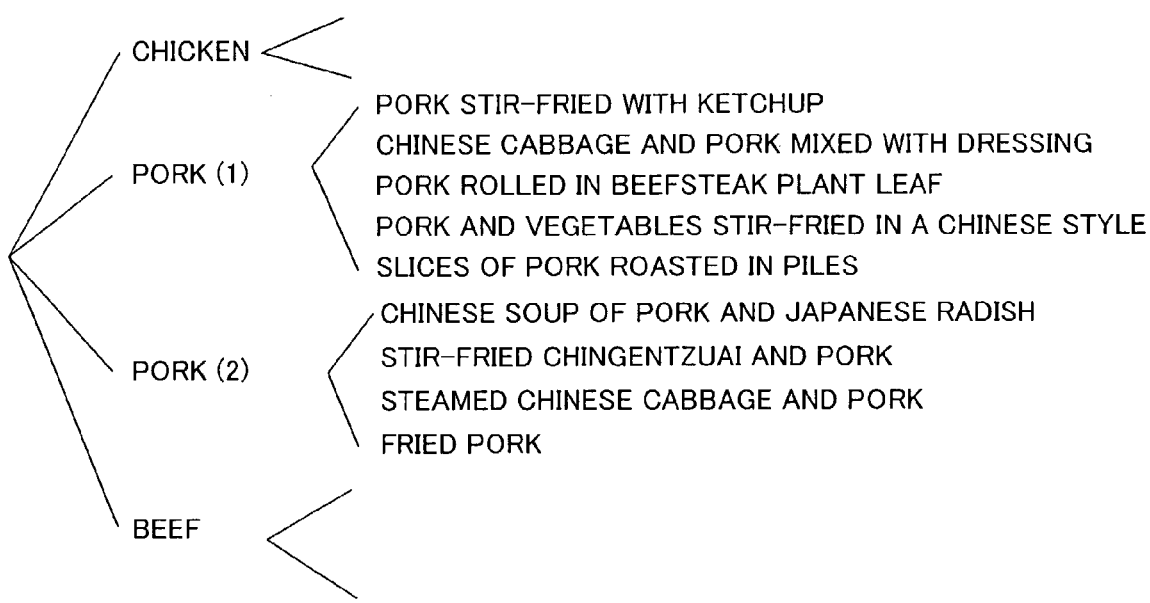
FIG. 17 shows another example of the updated recipe hierarchical information of FIG. 15.

Note that, in the example of FIG. 16, "pork (1)" and "pork (2)" are added under "pork". As shown in FIG. 17, however, "pork" may be replaced with the new retrieval keys, i.e., "pork (1)" and "pork (2)". In other words, "pork (1)" and "pork (2)" may be created at the same level as that of "chicken" and "beef". Although the recipe data are divided into two groups in the above example, the recipe data may alternatively be divided into three or more groups.

In the above example, the recipe data are arbitrarily classified. However, the recipe data may alternatively be classified according to a predetermined rule. For example, the recipe data may be classified according to the number of times the recipe data is viewed. In other words, the recipe data may be classified into the following two groups: the recipe data which have been viewed many times; and the recipe data which have been viewed only a few times.

Figure 18:
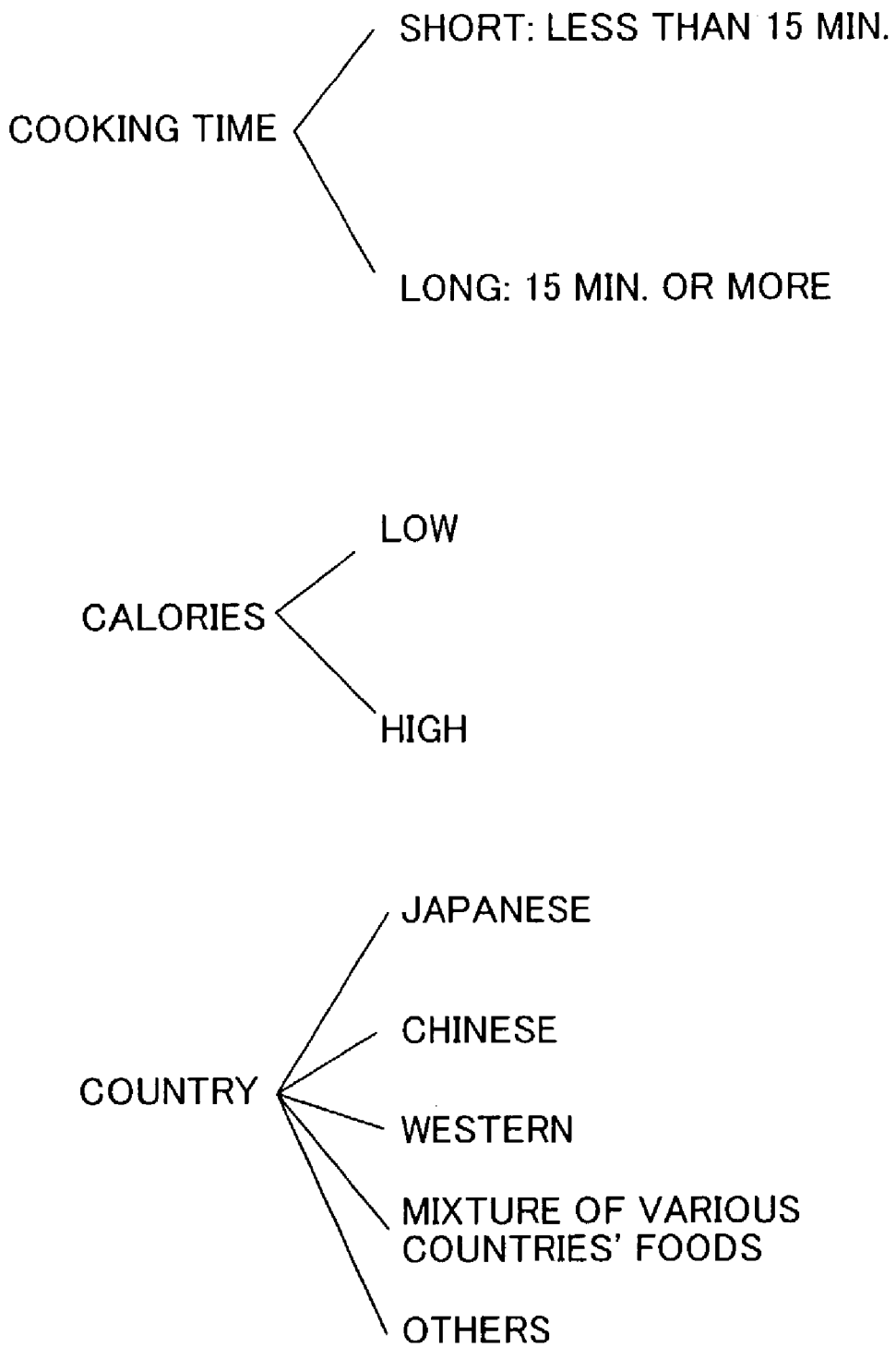
FIG. 18 shows an example of category information regarding the points other than ingredients.
Figure 19:
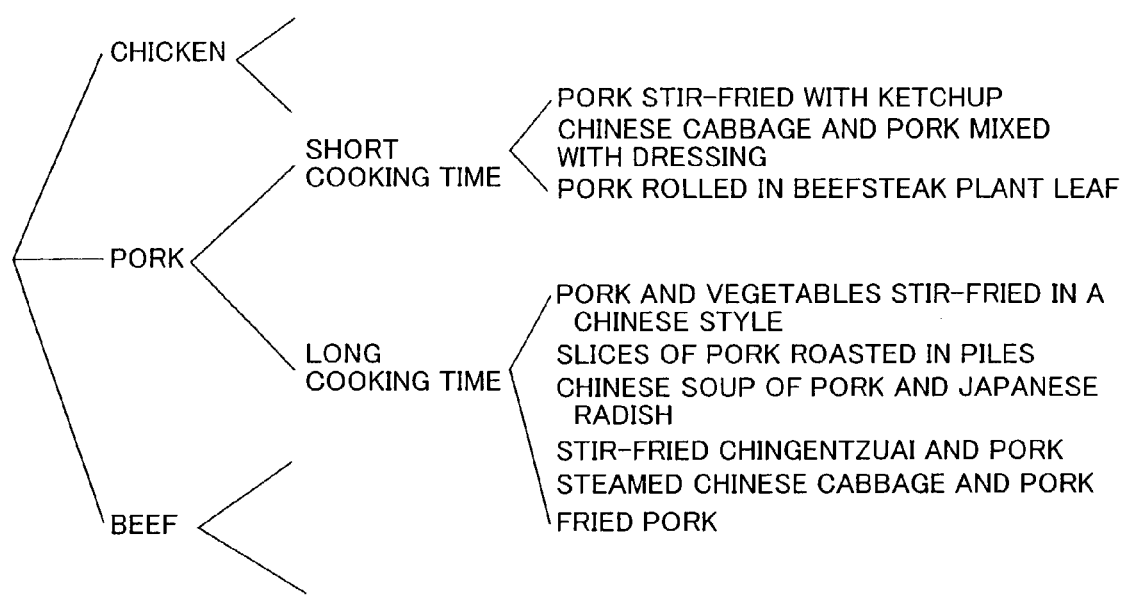
FIG. 19 shows an example of the recipe hierarchical information of FIG. 15 updated using the information of FIG. 18.

In addition to the overall hierarchical information 133 regarding the ingredients of the recipes, category information regarding other points such as cooking time, calories, and countries of the recipes may be stored as shown in FIG. 18. In this case, new retrieval keys may be introduced based on such category information. In the example of FIG. 19, the recipe data are classified based on cooking time, and "short cooking time" and "long cooking time" are introduced as new retrieval keys. Note that only the categories of a single level are shown in FIG. 18. However, the same algorithm can be applied even if the classified information of two or more levels is stored as in the case of FIG. 19.

Figure 20:
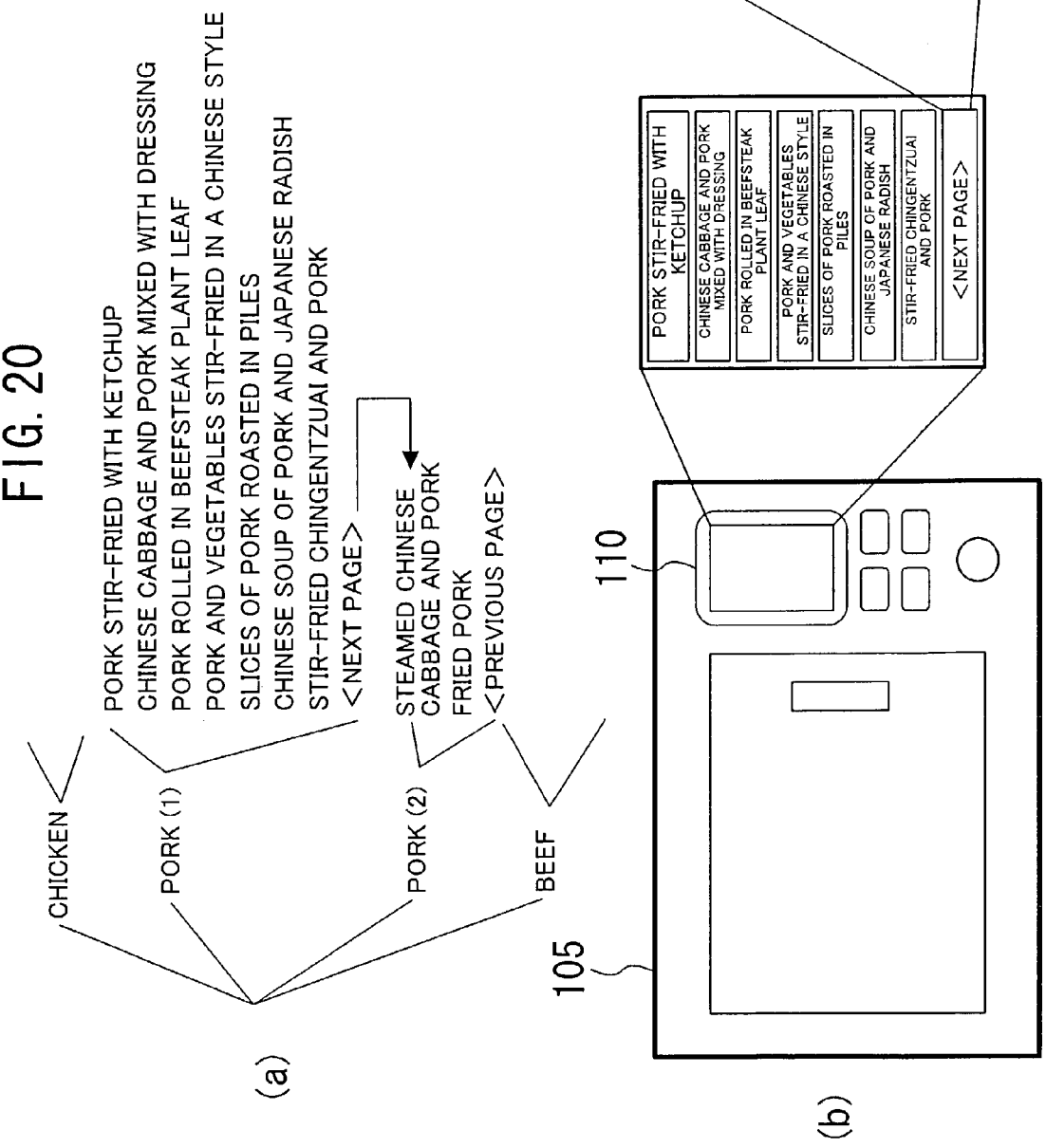
FIG. 20(a) shows an example of recipe hierarchical information including operation names.
FIG. 20(b) shows an example of display of this recipe hierarchical information on a screen.

As shown in FIG. 20(a), the recipe data may be divided into the following two groups: the group including seven recipe data and the operation name "next page"; and the group including two recipe data and the operation name "previous page". In this case, as shown in FIG. 20(b), the display on the screen can be quickly shifted from the first page displaying seven recipes to the second page displaying the remaining two recipes. Similarly, the display can be easily returned from the second page to the first page. In other words, if the recipe data are merely classified, the display cannot be shifted between the page of "pork (1)" and the page of "pork (2)" without interposing the page of the level right above the level of "pork (1)" and "pork (2)". However, inserting the operation names such as "next page" and "previous page" facilitates shifting between pages regarding the recipe data of the same category.

[Process of Deleting a Recipe]

Figure 21:
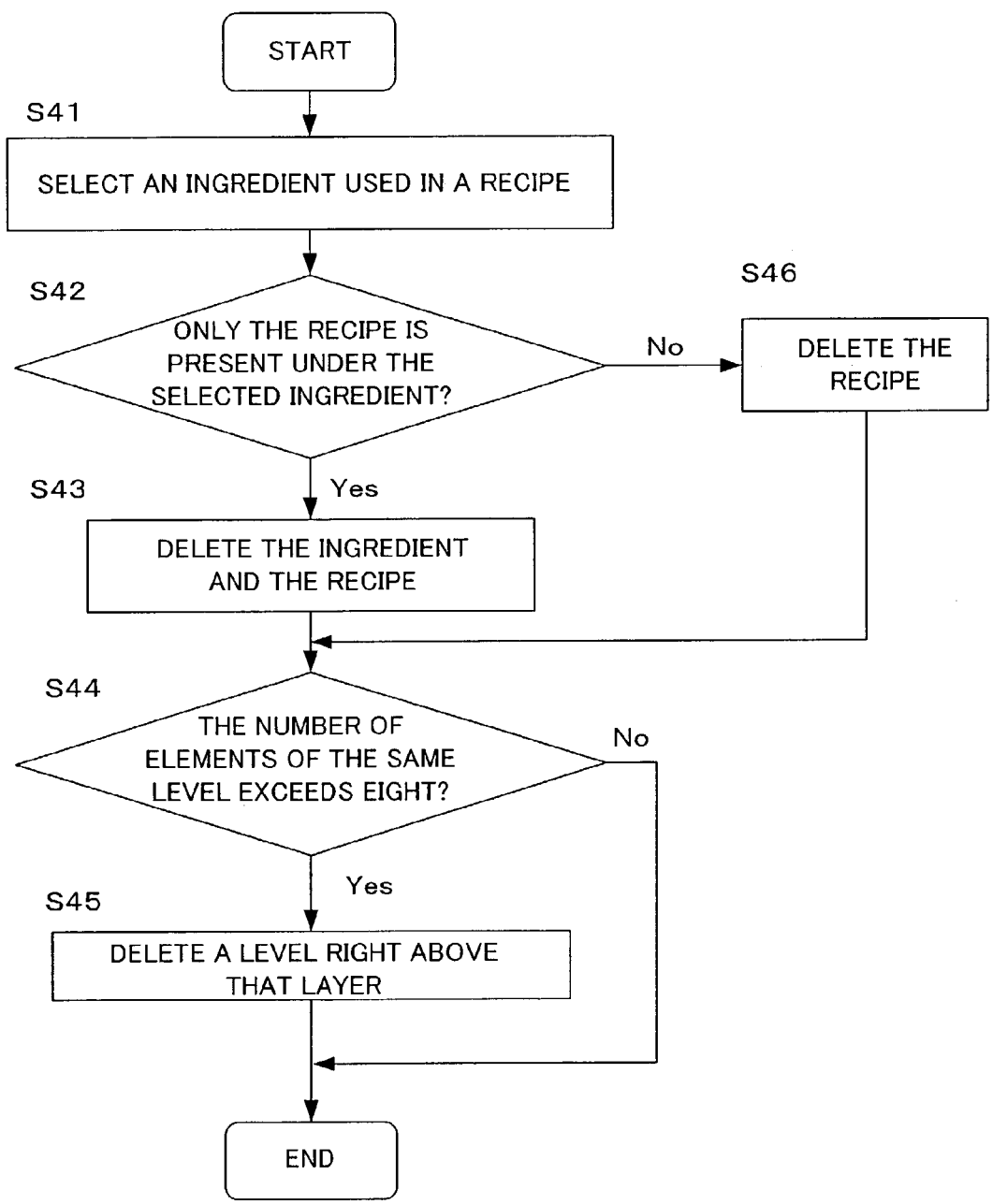
FIG. 21 is a flowchart of a process of deleting recipe data according to the second embodiment of the present invention.

In the above example, the process of adding recipe data is described. Hereinafter, the process of deleting recipe data will be described with reference to the flowchart of FIG. 21.

It is now assumed that the recipe hierarchical information 142 of FIG. 14 is stored, and the following five recipe data are included in the recipe hierarchical information 142: "Chinese cabbage kimchi"; "pork and vegetables stir-fried in a Chinese style"; "cabbage roll"; "Chikuzen-ni"; and "asparagus rolled in bacon". Hereinafter, the process of deleting "Chikuzen-ni" will be described.

First, "carrot", "burdock, lotus root" and "chicken (steamed or boiled)" are selected as main ingredients of "Chikuzen-ni" (S41). Only the recipe data "Chikuzen-ni" is present under each of the selected main ingredients, i.e., "carrot", "burdock, lotus root" and "chicken (steamed or boiled) (Yes in S42). Therefore, the routine proceeds to step S43. In step S43, "Chikuzen-ni" is deleted together with "carrot", "burdock, lotus root" and "chicken (steamed or boiled)".

Figure 22:
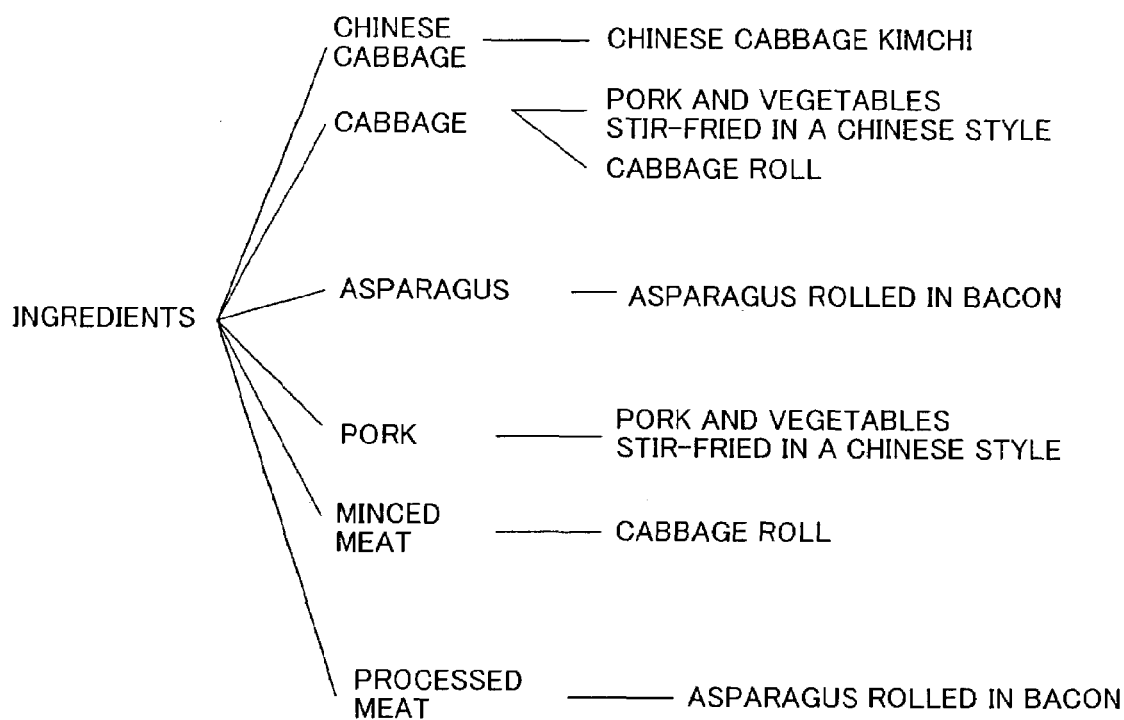
FIG. 22 shows an example of deleting recipe data from the recipe hierarchical information of FIG. 14.

Since the three ingredients, i.e., "carrot", "burdock, lotus root" and "chicken (steamed or boiled)", are deleted from the recipe hierarchical information 142 of FIG. 14, the number of elements at this level is reduced to six, i.e., "Chinese cabbage", "cabbage", "asparagus", "pork", "minced meat" and "processed meat". In other words, the number of elements of this level becomes equal to or less than the upper limit (i.e., eight) (Yes in S44). Accordingly, the routine proceeds to step S45, and the categories at the level right above this level are deleted. More specifically, "leaf vegetables", "fruit vegetables, flower vegetables", "root vegetables, mushrooms" and "meat" are deleted. As a result, the recipe hierarchical information 142 is updated as shown in FIG. 22.

Note that the operation of deleting one recipe data is described in the above example. In the present invention, however, recipe data are classified within the recipe hierarchical information 142 according to the ingredients and the like. Therefore, recipe data can be easily deleted on a category-by-category basis. For example, by providing a function to delete recipe data of a designated retrieved key at a time, recipe data using "meat" as an ingredient ("pork and vegetables stir-fried in a Chinese style", "cabbage roll", "Chikuzen-ni", and "asparagus rolled in bacon") can be easily deleted from the recipe hierarchical information 142 of FIG. 14. Without the classified levels according to the present invention, recipe data using, e.g., "meat" as an ingredient would have to be deleted one by one, which is inconvenient.

The method of the present embodiment is also effective for mobile equipments such as mobile phones and PDA. More specifically, these mobile equipments are intended for outdoor use. Therefore, the display portion of many mobile equipments is not large enough to allow the user to view a large amount of information. Accordingly, the use of the method of the present embodiment in the mobile equipments facilitates viewing and retrieval of recipe data.

Although the upper limit of the number of elements under each retrieval key is eight in the above example, it should be understood that the present invention is not limited to this. The user may want to display recipe data on an equipment different from the equipment which updated the recipe hierarchical information. The former equipment may have a different screen size and a different upper limit of the number of elements from those of the latter equipment. In this case, the recipe hierarchical information need only be updated using the upper limit of the former equipment.

Each of the above embodiments is described on the assumption that fixed overall hierarchical information is used. For example, however, a new classifying pattern of recipe data may be desired if a new foodstuff or the effects of a certain nutriment on health are found. In this case, the overall hierarchical information itself may be updated so that the classified levels of recipe data are updated or adapted for a specific application.

Recipe names and ingredients may actually be displayed on the screen in order of the number of times the recipe has been used (used for cooking, viewed and the like). This enables implementation of a user friendly interface. The user may be informed of the recipe data which has not been used. For example, this may be implemented by displaying that recipe data in a different color.

In the case where a recording medium such as a memory card is used to store recipe data, only a limited number of recipe data can be stored therein due to the storage capacity of the recording medium. Therefore, adding new recipe data is impossible if the remaining storage capacity is not large enough. In this case, recipe data which has not been used (or which has been used only a few times) may be preferentially deleted. Alternatively, recipe data which was added on a less recent date may be preferentially deleted.

In each of the above embodiments, the method for storing contents data according to the present invention is implemented by executing the classification/configuration algorithm module by the PC or server functioning as a terminal device. In other embodiments, the method for storing contents data according to the present invention can be implemented by executing a program by a computer. For example, in a cooking appliance, a microcomputer or CPU incorporated therein executes a program as a computer, whereby contents data can be stored in a recording medium such as a memory card in the same manner as that described in the above embodiments. In this case, data transmission and reception via a communication network is not necessarily required.

Each of the above embodiments has been described regarding recipe data. However, the present invention is similarly applicable to data for cooking other than the recipe data. In this case, the same effects as those of the above embodiments can be obtained. Examples of the data for cooking other than the recipe data are data regarding ingredients, data regarding nutritive values, and the like. Moreover, the present invention is similarly applicable to contents data other than the data for cooking. In this case, the same effects as those of the above embodiments can be obtained.

As has been described above, according to the present invention, contents hierarchical information is updated when new contents data is added or contents data is deleted. This ensures that the stored contents hierarchical information always accurately indicates currently stored recipe data. By conducting retrieve operation according to the classified levels of such accurate contents hierarchical information, the user can easily find desired contents data.

What is claimed is:

1. A terminal device having a computer for performing processing for a recording medium storing contents data, wherein the recording medium has contents hierarchical information which indicates classified levels of contents data recorded on the recording medium based on retrieval keys, and when contents data is deleted from the recording medium, the computer conducts:

a first step of retrieving a retrieval key of the contents data from the contents hierarchical information and specifying a root key of the retrieval key, a second step of determining whether or not the number of remaining child keys of the root key is one, a third step of, if the number of remaining child keys is one in the second step, deleting the root key and attaching the remaining child key to a root key of the root key, and a fourth step of deleting the contents data and the retrieval key from the contents hierarchical information.

2. A terminal device having a computer, for performing processing for a recording medium storing contents data, wherein the recording medium has contents hierarchical information which indicates classified levels of contents data recorded on the recording medium based on retrieval keys, and when new contents data is added to the recording medium, the computer conducts:

a first step of determining whether or not the contents hierarchical information has a retrieval key associated with the contents data, and if the contents hierarchical information has the retrieval key, allocating the contents data to the retrieval key, a second step of, if the contents hierarchical information does not have the retrieval key in the first step, retrieving the retrieval key from overall hierarchical information which are stored in the computer or the recording medium and indicates a hierarchical relation of the retrieval keys in the whole contents, and retrieving a root key of the retrieval key, and a third step of determining whether or not the contents hierarchical information has the root key, and if the contents hierarchical information does not have the root key, determining whether or not the contents hierarchical information has any one of child keys of the root key, and if the contents hierarchical information has any one of child keys of the root key, inserting the root key above the child key, adding the retrieval key under the root key, and allocating the contents data to the retrieval key.

3. A method for storing contents data in a recording medium, wherein the recording medium has contents hierarchical information which indicates classified levels of contents data recorded on the recording medium based on retrieval keys, and when contents data is deleted from the recording medium, a computer conducts:

a first step of retrieving a retrieval key of the contents data from the contents hierarchical information and specifying a root key of the retrieval key, a second step of determining whether or not the number of remaining child keys of the root key is one, a third step of, if the number of remaining child keys is one in the second step, deleting the root key and attaching the remaining child key to a root key of the root key, and a fourth step of deleting the contents data and the retrieval key from the contents hierarchical information.

4. A method for storing contents data in a recording medium, wherein the recording medium has contents hierarchical information which indicates classified levels of contents data recorded on the recording medium based on retrieval keys, and when new contents data is added to the recording medium, a computer conducts:

a first step of determining whether or not the contents hierarchical information has a retrieval key associated with the contents data, and if the contents hierarchical information has the retrieval key, allocating the contents data to the retrieval key, a second step of, if the contents hierarchical information does not have the retrieval key in the first step, retrieving the retrieval key from overall hierarchical information which are stored in the computer or the recording medium and indicates a hierarchical relation of the retrieval keys in the whole contents, and retrieving a root key of the retrieval key, and a third step of determining whether or not the contents hierarchical information has the root key, and if the contents hierarchical information does not have the root key, determining whether or not the contents hierarchical information has any one of child keys of the root key, and if the contents hierarchical information has any one of child keys of the root key, inserting the root key above the child key, adding the retrieval key under the root key, and allocating the contents data to the retrieval key.

5. A program for causing a computer to conduct a method for storing contents data in a recording medium, wherein the recording medium has contents hierarchical information which indicates classified levels of contents data recorded on the recording medium based on retrieval keys, and when contents data is deleted from the recording medium, the program causes the computer to conduct:

a first step of retrieving a retrieval key of the contents data from the contents hierarchical information and specifying a root key of the retrieval key, a second step of determining whether or not the number of remaining child keys of the root key is one, a third step of, if the number of remaining child keys is one in the second step, deleting the root key and attaching the remaining child key to a root key of the root key, and a fourth step of deleting the contents data and the retrieval key from the contents hierarchical information.

6. A program for causing a computer to conduct a method for storing contents data in a recording medium, wherein the recording medium has contents hierarchical information which indicates classified levels of contents data recorded on the recording medium based on retrieval keys, and when new contents data is added to the recording medium, the program causes the computer to conduct:

a first step of determining whether or not the contents hierarchical information has a retrieval key associated with the contents data, and if the contents hierarchical information has the retrieval key, allocating the contents data to the retrieval key, a second step of, if the contents hierarchical information does not have the retrieval key in the first step, retrieving the retrieval key from overall hierarchical information which are stored in the computer or the recording medium and indicates a hierarchical relation of the retrieval keys in the whole contents, and retrieving a root key of the retrieval key, and a third step of determining whether or not the contents hierarchical information has the root key, and if the contents hierarchical information does not have the root key, determining whether or not the contents hierarchical information has any one of child keys of the root key, and if the contents hierarchical information has any one of child keys of the root key, inserting the root key above the child key, adding the retrieval key under the root key, and allocating the contents data to the retrieval key.

* * * * *

UNITED STATES PATENT AND TRADEMARK OFFICE
CERTIFICATE OF CORRECTION

PATENT NO. : 7,660,722 B2  
APPLICATION NO. : 10/344822  
DATED : February 9, 2010  
INVENTOR(S) : Ozawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2068 days.

Signed and Sealed this

Thirtieth Day of November, 2010

David J. Kappos
*Director of the United States Patent and Trademark Office*